(12) United States Patent
Weber et al.

(10) Patent No.: US 9,091,408 B2
(45) Date of Patent: *Jul. 28, 2015

(54) RECYCLING BACKLIGHTS WITH SEMI-SPECULAR COMPONENTS

(71) Applicant: 3M INNOVATIVE PROPERTIES COMPANY, St. Paul, MN (US)

(72) Inventors: Michael F. Weber, Shoreview, MN (US); Timothy J. Nevitt, Red Wing, MN (US); John A. Wheatley, Lake Elmo, MN (US); Rolf W. Biernath, Wyoming, MN (US); David G. Freier, St. Paul, MN (US); Gilles J. Benoit, Minneapolis, MN (US); Charles D. Hoyle, Stillwater, MN (US); Andrew J. Ouderkirk, St. Paul, MN (US); Zhaohui Yang, North Oaks, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 72 days.

This patent is subject to a terminal disclaimer.

(21) Appl. No.: 14/082,788

(22) Filed: Nov. 18, 2013

(65) Prior Publication Data

US 2014/0071658 A1    Mar. 13, 2014

Related U.S. Application Data

(63) Continuation of application No. 12/600,878, filed as application No. PCT/US2008/064115 on May 19, 2008, now Pat. No. 8,608,363.

(60) Provisional application No. 60/939,085, filed on May 20, 2007.

(51) Int. Cl.
*F21V 7/04* (2006.01)
*F21V 7/00* (2006.01)
(Continued)

(52) U.S. Cl.
CPC ... *F21V 7/00* (2013.01); *F21K 9/50* (2013.01); *G02B 6/0055* (2013.01);
(Continued)

(58) Field of Classification Search
CPC .......... F21V 7/00; F21K 9/50; G02B 6/0055; G02B 6/0096; G02F 1/133606; G02F 1/133611
USPC .............. 362/97.1–97.4, 249.02, 296.01, 362/297–298, 301, 341, 346, 800; 349/61–62, 67

See application file for complete search history.

(56) References Cited

U.S. PATENT DOCUMENTS 3,610,729 A    10/1971  Rogers
3,711,176 A     1/1973  Alfrey, Jr.
(Continued)

FOREIGN PATENT DOCUMENTS

DE    199 61 491    12/2000
EP    0 426 397     5/1991
(Continued)

OTHER PUBLICATIONS

Baker et al.,*Daylighting in Architecture: A European Reference Book*, pp. 4.3-4.5 1993.
(Continued)

*Primary Examiner* — Jason Moon Han
(74) *Attorney, Agent, or Firm* — Lisa P. Fulton

(57) ABSTRACT

A recycling cavity such as used in a backlight or similar extended area source includes a front and back reflector, the front reflector being partially transmissive to provide an output illumination area. The recycling cavity also includes a component that provides the cavity with a balance of specular and diffuse characteristics so as to balance cavity efficiency and brightness uniformity over the output area. The component can be characterized by a transport ratio of greater than 15% for a 15 degree incidence angle, and less than 95% for a 45 degree incidence angle.

19 Claims, 8 Drawing Sheets

(51) Int. Cl.
   *F21V 8/00* (2006.01)
   *F21K 99/00* (2010.01)
   *G02F 1/1335* (2006.01)

(52) U.S. Cl.
   CPC ....... *G02B 6/0096* (2013.01); *G02F 1/133606* (2013.01); *G02F 1/133611* (2013.01); *G02B 6/0056* (2013.01); *G02F 1/13362* (2013.01); *G02F 1/133605* (2013.01); *G02F 1/133615* (2013.01)

(56) References Cited

U.S. PATENT DOCUMENTS

| | | |
|---|---|---|
| 3,773,882 A | 11/1973 | Schrenk |
| 3,884,606 A | 5/1975 | Schrenk |
| 4,040,727 A | 8/1977 | Ketchpel |
| 4,446,305 A | 5/1984 | Rogers |
| 4,456,336 A | 6/1984 | Chung |
| 4,540,623 A | 9/1985 | Im |
| 4,791,540 A | 12/1988 | Dreyer |
| 5,103,337 A | 4/1992 | Schrenk |
| 5,126,880 A | 6/1992 | Wheatley |
| 5,136,479 A | 8/1992 | Ruffner |
| 5,337,068 A | 8/1994 | Stewart |
| 5,360,659 A | 11/1994 | Arends |
| 5,381,309 A | 1/1995 | Borchardt |
| 5,440,197 A | 8/1995 | Gleckman |
| 5,448,404 A | 9/1995 | Schrenk |
| 5,453,855 A | 9/1995 | Nakamura |
| 5,568,316 A | 10/1996 | Schrenk |
| 5,594,830 A | 1/1997 | Winston |
| 5,751,388 A | 5/1998 | Larson |
| 5,771,328 A | 6/1998 | Wortman |
| 5,793,456 A | 8/1998 | Broer |
| 5,816,677 A | 10/1998 | Kurematsu |
| 5,825,543 A | 10/1998 | Ouderkirk |
| 5,828,488 A | 10/1998 | Ouderkirk |
| 5,845,038 A | 12/1998 | Lundin |
| 5,867,316 A | 2/1999 | Carlson |
| 5,882,774 A | 3/1999 | Jonza |
| 5,965,247 A | 10/1999 | Jonza |
| 5,971,551 A | 10/1999 | Winston |
| 5,976,686 A | 11/1999 | Kaytor |
| 6,019,485 A | 2/2000 | Winston |
| 6,036,328 A | 3/2000 | Ohtsuki |
| 6,080,467 A | 6/2000 | Weber |
| 6,122,103 A | 9/2000 | Perkins |
| 6,157,486 A | 12/2000 | Benson, Jr. |
| 6,157,490 A | 12/2000 | Wheatley |
| 6,210,785 B1 | 4/2001 | Weber |
| 6,262,842 B1 | 7/2001 | Ouderkirk |
| 6,267,492 B1 | 7/2001 | Reid |
| 6,276,803 B1 | 8/2001 | Aoyama |
| 6,280,063 B1 | 8/2001 | Fong |
| 6,282,821 B1 | 9/2001 | Freier |
| 6,354,709 B1 | 3/2002 | Campbell |
| 6,367,941 B2 | 4/2002 | Lea |
| 6,368,699 B1 | 4/2002 | Gilbert |
| 6,454,452 B1 | 9/2002 | Sasagawa |
| 6,531,230 B1 | 3/2003 | Weber |
| 6,566,689 B2 | 5/2003 | Hoelen |
| 6,600,175 B1 | 7/2003 | Baretz et al. |
| 6,636,283 B2 | 10/2003 | Sasagawa |
| 6,663,262 B2 | 12/2003 | Boyd et al. |
| 6,673,425 B1 | 1/2004 | Hebrink |
| 6,738,349 B1 | 5/2004 | Cen |
| 6,762,743 B2 | 7/2004 | Yoshihara |
| 6,783,349 B2 | 8/2004 | Neavin |
| 6,788,358 B1 | 9/2004 | Kim |
| 6,809,892 B2 | 10/2004 | Toyooka |
| 6,814,456 B1 | 11/2004 | Huang |
| 6,846,089 B2 | 1/2005 | Stevenson |
| 6,893,135 B2 | 5/2005 | Wright |
| 6,895,164 B2 | 5/2005 | Saccomanno |
| 6,905,212 B2 | 6/2005 | Pate |
| 6,905,220 B2 | 6/2005 | Wortman |
| 6,917,399 B2 | 7/2005 | Pokorny |
| 6,937,303 B2 | 8/2005 | Jang |
| 6,974,229 B2 | 12/2005 | West |
| 6,975,455 B1 | 12/2005 | Kotchick |
| 7,009,343 B2 | 3/2006 | Lim |
| 7,052,168 B2 | 5/2006 | Epstein |
| 7,072,096 B2 | 7/2006 | Holman |
| 7,164,836 B2 | 1/2007 | Wright |
| 7,178,965 B2 | 2/2007 | Parker |
| 7,220,026 B2 | 5/2007 | Ko |
| 7,220,036 B2 | 5/2007 | Yi |
| 7,223,005 B2 | 5/2007 | Lamb |
| 7,229,198 B2 | 6/2007 | Sakai |
| 7,277,609 B2 | 10/2007 | Cassarly |
| 7,285,802 B2 | 10/2007 | Ouderkirk |
| 7,296,916 B2 | 11/2007 | Ouderkirk |
| 7,317,182 B2 | 1/2008 | Schultz |
| 7,320,538 B2 | 1/2008 | Ko |
| 7,329,982 B2 | 2/2008 | Conner |
| 7,364,342 B2 | 4/2008 | Parker et al. |
| 7,416,309 B2 | 8/2008 | Ko |
| 7,436,469 B2 | 10/2008 | Gehlsen |
| 7,436,996 B2 | 10/2008 | Ben-Chorin |
| 7,446,827 B2 | 11/2008 | Ko |
| 7,481,563 B2 | 1/2009 | David |
| 7,513,634 B2 | 4/2009 | Chen |
| 7,525,126 B2 | 4/2009 | Leatherdale |
| 7,604,381 B2 | 10/2009 | Hebrink |
| 7,607,814 B2 | 10/2009 | Destain |
| 7,660,509 B2 | 2/2010 | Bryan |
| 7,695,180 B2 | 4/2010 | Schardt |
| 7,740,387 B2 | 6/2010 | Schultz |
| 7,773,834 B2 | 8/2010 | Ouderkirk |
| 8,469,575 B2 | 6/2013 | Weber |
| 8,523,419 B2 | 9/2013 | Nevitt |
| 8,740,442 B2 | 6/2014 | Weber |
| 8,757,858 B2 | 6/2014 | Aastuen |
| 8,848,132 B2 | 9/2014 | O'Neill |
| 2001/0030857 A1 | 10/2001 | Futhey et al. |
| 2002/0060907 A1 | 5/2002 | Saccomanno |
| 2002/0070914 A1 | 6/2002 | Bruning et al. |
| 2002/0141194 A1 | 10/2002 | Wortman |
| 2002/0159019 A1 | 10/2002 | Pokorny |
| 2002/0175632 A1 | 11/2002 | Takeguchi |
| 2003/0043567 A1 | 3/2003 | Hoelen |
| 2003/0086680 A1 | 5/2003 | Saccomanno |
| 2003/0202363 A1 | 10/2003 | Adachi |
| 2004/0061814 A1 | 4/2004 | Kim |
| 2004/0066651 A1 | 4/2004 | Harumoto |
| 2004/0119908 A1 | 6/2004 | Sakai |
| 2004/0196667 A1 | 10/2004 | Lea |
| 2004/0219338 A1 | 11/2004 | Hebrink |
| 2005/0007756 A1 | 1/2005 | Yu |
| 2005/0007758 A1 | 1/2005 | Lee |
| 2005/0063195 A1 | 3/2005 | Kawakami |
| 2005/0073825 A1 | 4/2005 | Kuo |
| 2005/0135115 A1 | 6/2005 | Lamb |
| 2005/0135117 A1 | 6/2005 | Lamb |
| 2005/0200295 A1 | 9/2005 | Lim |
| 2005/0243576 A1 | 11/2005 | Park |
| 2005/0265029 A1 | 12/2005 | Epstein et al. |
| 2005/0265042 A1 | 12/2005 | Kim |
| 2005/0265046 A1 | 12/2005 | Liu |
| 2005/0280756 A1 | 12/2005 | Kim |
| 2005/0285133 A1 | 12/2005 | Hung |
| 2005/0286264 A1 | 12/2005 | Kim |
| 2006/0002141 A1 | 1/2006 | Ouderkirk |
| 2006/0005620 A1 | 1/2006 | Koike |
| 2006/0028817 A1 | 2/2006 | Parker |
| 2006/0082700 A1 | 4/2006 | Gehlsen |
| 2006/0103777 A1 | 5/2006 | Ko |
| 2006/0124918 A1 | 6/2006 | Miller |
| 2006/0131601 A1 | 6/2006 | Ouderkirk |
| 2006/0146562 A1 | 7/2006 | Ko |
| 2006/0146566 A1 | 7/2006 | Ko |
| 2006/0152943 A1 | 7/2006 | Ko |
| 2006/0187650 A1 | 8/2006 | Epstein |
| 2006/0193577 A1 | 8/2006 | Ouderkirk |

(56) References Cited

U.S. PATENT DOCUMENTS

| | | |
|---|---|---|
| 2006/0210726 A1 | 9/2006 | Jones |
| 2006/0220040 A1 | 10/2006 | Suzuki |
| 2006/0221610 A1 | 10/2006 | Chew |
| 2006/0250707 A1 | 11/2006 | Whitney |
| 2006/0257678 A1 | 11/2006 | Benson |
| 2006/0262564 A1 | 11/2006 | Baba |
| 2006/0268554 A1 | 11/2006 | Whitehead |
| 2006/0284569 A1 | 12/2006 | Wey |
| 2006/0290842 A1 | 12/2006 | Epstein |
| 2006/0290844 A1 | 12/2006 | Epstein |
| 2007/0008722 A1 | 1/2007 | Fujino |
| 2007/0024994 A1 | 2/2007 | Whitney |
| 2007/0047228 A1 | 3/2007 | Thompson |
| 2007/0047254 A1 | 3/2007 | Schardt |
| 2007/0047262 A1 | 3/2007 | Schardt |
| 2007/0081330 A1 | 4/2007 | Lee |
| 2007/0091641 A1 | 4/2007 | Lin |
| 2007/0092728 A1 | 4/2007 | Ouderkirk |
| 2007/0147037 A1 | 6/2007 | Wang |
| 2007/0153162 A1 | 7/2007 | Wright |
| 2007/0153384 A1 | 7/2007 | Ouderkirk |
| 2007/0153548 A1 | 7/2007 | Hamada |
| 2007/0171676 A1 | 7/2007 | Chang |
| 2007/0189032 A1 | 8/2007 | Chang |
| 2007/0223245 A1 | 9/2007 | Lee |
| 2007/0257266 A1 | 11/2007 | Leatherdale |
| 2007/0257270 A1 | 11/2007 | Lu |
| 2007/0258241 A1 | 11/2007 | Leatherdale |
| 2007/0258246 A1 | 11/2007 | Leatherdale |
| 2008/0002256 A1 | 1/2008 | Sasagawa |
| 2008/0025045 A1 | 1/2008 | Mii |
| 2008/0037127 A1 | 2/2008 | Weber |
| 2008/0049419 A1 | 2/2008 | Ma |
| 2008/0057277 A1 | 3/2008 | Bluem |
| 2008/0192174 A1 | 8/2008 | Odake |
| 2010/0156953 A1 | 6/2010 | Nevitt |
| 2010/0165001 A1 | 7/2010 | Savvateev |
| 2010/0165621 A1 | 7/2010 | Hoffend |
| 2010/0165660 A1 | 7/2010 | Weber |
| 2010/0283074 A1 | 11/2010 | Kelley |
| 2010/0302479 A1 | 12/2010 | Aronson |
| 2010/0315832 A1 | 12/2010 | Pijlman |
| 2011/0051047 A1 | 3/2011 | O'Neill |
| 2011/0075398 A1 | 3/2011 | Wheatley |
| 2011/0096529 A1 | 4/2011 | Wheatley |
| 2011/0134659 A1 | 6/2011 | Aastuen |
| 2014/0240981 A1 | 8/2014 | Weber |

FOREIGN PATENT DOCUMENTS

| | | |
|---|---|---|
| EP | 0 650 010 | 4/1995 |
| EP | 1 070 913 | 1/2001 |
| EP | 1 376 708 | 1/2004 |
| EP | 1 333 705 | 8/2004 |
| EP | 1 640 756 | 3/2006 |
| EP | 1 837 701 | 9/2007 |
| EP | 1 942 302 | 9/2008 |
| JP | 09-005737 | 1/1997 |
| JP | 11-72625 | 3/1999 |
| JP | 2004-031180 | 1/2004 |
| JP | 2004-055430 | 2/2004 |
| JP | 2004-071576 | 3/2004 |
| JP | 2004-087973 | 3/2004 |
| JP | 2004-158336 | 6/2004 |
| JP | 2004-171947 | 6/2004 |
| JP | 2004-342429 | 12/2004 |
| JP | 2005-093147 | 4/2005 |
| JP | 2005-173546 | 6/2005 |
| JP | 2005-292546 | 10/2005 |
| JP | 2005-327682 | 11/2005 |
| JP | 2006-221922 | 8/2006 |
| JP | 2006-269364 | 10/2006 |
| JP | 2006-269365 | 10/2006 |
| JP | 2008-060061 | 3/2008 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 97/01726 | 1/1997 |
| WO | WO 99/36248 | 7/1999 |
| WO | WO 99/36262 | 7/1999 |
| WO | WO 99/39224 | 8/1999 |
| WO | WO 00/43815 | 7/2000 |
| WO | WO 02/097324 | 12/2002 |
| WO | WO 2004/031818 | 4/2004 |
| WO | WO 2006/010249 | 2/2006 |
| WO | WO 2006/043344 | 4/2006 |
| WO | WO 2006/125174 | 11/2006 |
| WO | WO 2008/144636 | 11/2008 |
| WO | WO 2008/144650 | 11/2008 |
| WO | WO 2008/144656 | 11/2008 |
| WO | WO 2008/146229 | 12/2008 |
| WO | WO 2008/147753 | 12/2008 |
| WO | WO 2009/100307 | 8/2009 |
| WO | WO 2009/105450 | 8/2009 |

OTHER PUBLICATIONS

Blanco et al., "Asymmetric CPC Solar Collectors with Tubular Receiver: Geometric Characteristics and Optimal Configurations", Solar Energy, vol. 37, No. 1, pp. 49-54, 1986.

Cai et al., "Reflectors for Efficient and Uniform Distribution of Radiation for Lighting and Infrared Based on Non-Imaging Optics", SPIE, vol. 1528, pp. 118-128, 1991.

Collares-Pereira et al., "High Concentration Two-Stage Optics for Parabolic Trough Solar Collectors with Tubular Absorber and Large Rim Angle", Solar Energy, vol. 47, No. 6, pp. 457-466, 1991.

3M Diffusing Film Alternative (DFA), Maximum uniformity and efficiency in flat panel displays, Brochure, 2 pages, 1996.

Denker et al., 45.1: Invited Paper: Advanced Polarizer Film for Improved Performance of Liquid Crystal Displays, 3 pages, SID 2006.

Freyssinier et al., "Evaluation of light emitting diodes for signage applications", Third International Conference of Solid State Lighting, Proceedings of SPIE, 5187, 309-317, 2004.

Hung et al., Novel Design for LED Lens and Backlight System, pp. 476-479, IDMC 2007 Taipei, Taiwan.

Kalantar and Okada, "RGB-LED Backlighting Monitor/TV for Reproduction of Images in Standard and Extended Color Spaces", FMC10-3, pp. 683-686, International Display Workshop, 2004.

Macleod, H.A., Thin-film optical filters, Second Edition, Title Page and Table of Contents, MacMillan Publishing Co., New York, 1986.

Stover, Carl PhD, Advanced Polarizer Film for Improved Performance of Liquid Crystal Displays, 10 pages, Presented at the Society for Information Displays International Conference, San Francisco, CA, Jun. 4-9, 2006.

TCO 05 (The Swedish Confederation of Professional Employees, version 2.0, Sep. 21, 2005, p. 9.

Thelan, Design of Optical Interference Coatings, McGraw Hill, Inc., Title Page, Table of Contents, and Preface, 5 pages, 1989.

Tripanagnostopoulos, Y. and Souliotis, M., "Intergrated collector storage solar systems with asymmetric CPC reflectors", Renewable Energy, vol. 29, pp. 223-248, www.sciencedirect.com, 2004.

Video Electronics Standards Association (VESA), Flat Panel Display Measurements Standard, v. 2.0, Jun. 1, 2001.

Vikuiti™ Display Enhancement Brochure, Vikuiti™ Brightness Enhancement Film (BEF) II, 2 pages, Copyright © 3M IPC, 2002.

Vikuiti™ Display Enhancement Brochure, Vikuiti™ Brightness Enhancement Film-Diffuse 400 (DBEF-D400), 2 pages, Copyright ©, 2004.

Vikuiti™ Display Enhancement Brochure, Vikuiti™ Dual Brightness Enhancement Film—Diffuse 550 (DBEF-D550), 2 pages, © 3M 2004.

Weber et al., "Giant Birefringent Optics in Multilayer Polymer Mirrors", Science, vol. 287, Mar. 2000.

Winston et al., Nonimaging Optics, Title Page & Table of Contents, Elsevier Academic Press, Amsterdam, 2005.

Search Report for International Application No. PCT/US2008/064155, 7 pgs.

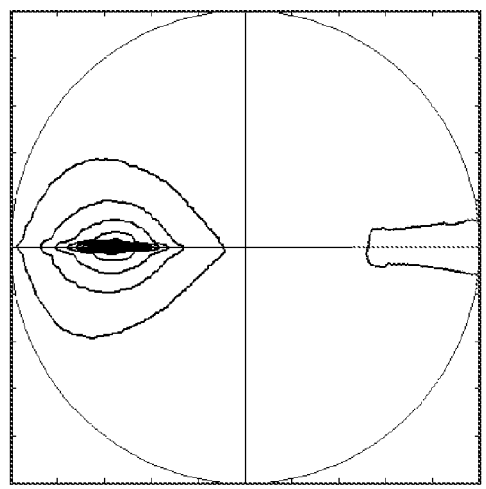 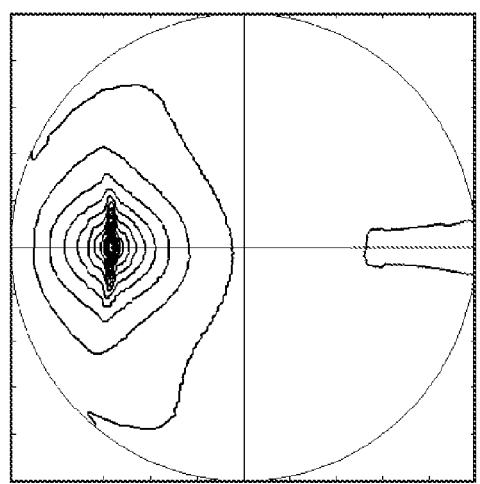
*Fig. 18a*  *Fig. 18b*
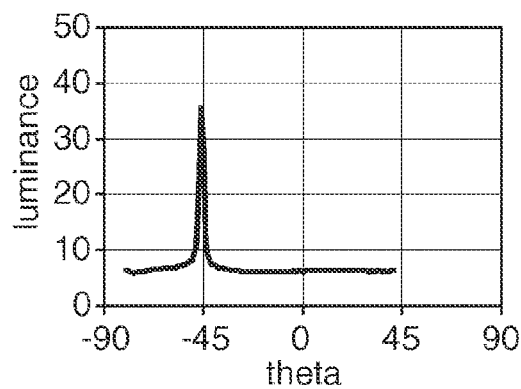 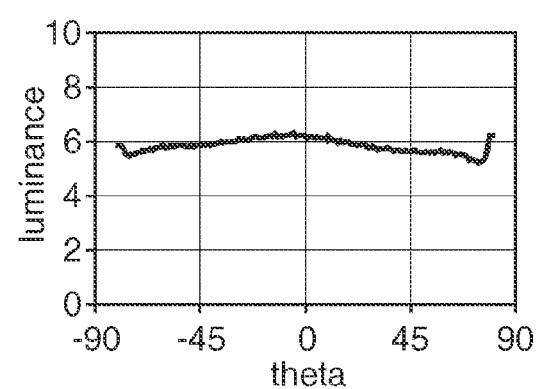
*Fig. 19a*  *Fig. 19b*
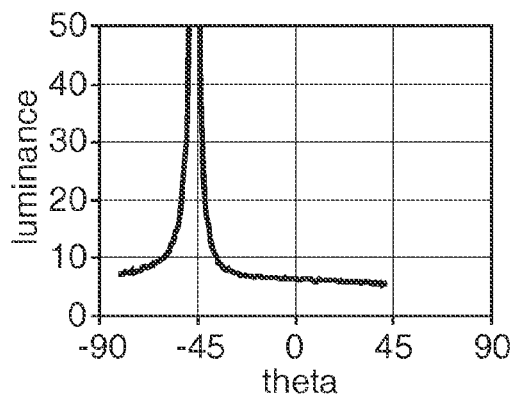 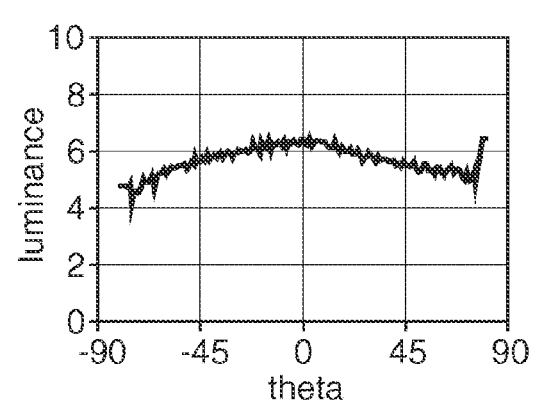
*Fig. 20a*  *Fig. 20b*

RECYCLING BACKLIGHTS WITH SEMI-SPECULAR COMPONENTS

CROSS REFERENCE TO RELATED APPLICATIONS

This application is a continuation of U.S. application Ser. No. 12/600,878, filed May 10, 2010, now allowed, which claims priority to national stage filing under 35 U.S.C. §371 of PCT/US2008/064115, filed May 19, 2008, which claims priority to U.S. Provisional Application No. 60/939,085 filed May 20, 2007, the disclosure of which is incorporated by reference in its/their entirety herein.

FIELD

The present invention relates to extended area light sources suitable for illuminating a display or other graphic from behind, commonly referred to as backlights, as well as similar extended area lighting devices. The invention is particularly applicable to backlights that include a front and back reflector, between which is formed a hollow light recycling cavity.

BACKGROUND

Backlights can be considered to fall into one of two categories depending on where the internal light sources are positioned relative to the output area of the backlight, where the backlight "output area" corresponds to the viewable area or region of the display device. The "output area" of a backlight is sometimes referred to herein as an "output region" or "output surface" to distinguish between the region or surface itself and the area (the numerical quantity having units of square meters, square millimeters, square inches, or the like) of that region or surface.

The first category is "edge-lit." In an edge-lit backlight, one or more light sources are disposed—from a plan-view perspective—along an outer border or periphery of the backlight construction, generally outside the area or zone corresponding to the output area. Often, the light source(s) are shielded from view by a frame or bezel that borders the output area of the backlight. The light source(s) typically emit light into a component referred to as a "light guide," particularly in cases where a very thin profile backlight is desired, as in laptop computer displays. The light guide is a clear, solid, and relatively thin plate whose length and width dimensions are on the order of the backlight output area. The light guide uses total internal reflection (TIR) to transport or guide light from the edge-mounted lamps across the entire length or width of the light guide to the opposite edge of the backlight, and a non-uniform pattern of localized extraction structures is provided on a surface of the light guide to redirect some of this guided light out of the light guide toward the output area of the backlight. Such backlights typically also include light management films, such as a reflective material disposed behind or below the light guide, and a reflective polarizing film and prismatic BEF film(s) disposed in front of or above the light guide to increase on-axis brightness.

In the view of Applicants, drawbacks or limitations of existing edge-lit backlights include the relatively large mass or weight associated with the light guide, particularly for larger backlight sizes; the need to use components that are non-interchangeable from one backlight to another, since light guides must be injection molded or otherwise fabricated for a specific backlight size and for a specific source configuration; the need to use components that require substantial spatial non-uniformities from one position in the backlight to another, as with existing extraction structure patterns; and, as backlight sizes increase, increased difficulty in providing adequate illumination due to limited space or "real estate" along the edge of the display, since the ratio of the circumference to the area of a rectangle decreases linearly (1/L) with the characteristic in-plane dimension L (e.g., length, or width, or diagonal measure of the output region of the backlight, for a given aspect ratio rectangle).

The second category is "direct-lit." In a direct-lit backlight, one or more light sources are disposed—from a plan-view perspective—substantially within the area or zone corresponding to the output area, normally in a regular array or pattern within the zone. Alternatively, one can say that the light source(s) in a direct-lit backlight are disposed directly behind the output area of the backlight. A strongly diffusing plate is typically mounted above the light sources to spread light over the output area. Again, light management films, such as a reflective polarizer film and prismatic BEF film(s), can also be placed atop the diffuser plate for improved on-axis brightness and efficiency.

In the view of Applicants, drawbacks or limitations of existing direct-lit backlights include inefficiencies associated with the strongly diffusing plate; in the case of LED sources, the need for large numbers of such sources for adequate uniformity and brightness, with associated high component cost and heat generation; and limitations on achievable thinness of the backlight beyond which light sources produce non-uniform and undesirable "punchthrough," wherein a bright spot appears in the output area above each source.

In some cases, a direct-lit backlight may also include one or some light sources at the periphery of the backlight, or an edge-lit backlight may include one or some light sources directly behind the output area. In such cases, the backlight is considered "direct-lit" if most of the light originates from directly behind the output area of the backlight, and "edge-lit" if most of the light originates from the periphery of the output area of the backlight.

Backlights of one type or another are usually used with liquid crystal (LC)-based displays. Liquid crystal display (LCD) panels, because of their method of operation, utilize only one polarization state of light, and hence for LCD applications it may be important to know the backlight's brightness and uniformity for light of the correct or useable polarization state, rather than simply the brightness and uniformity of light that may be unpolarized. In that regard, with all other factors being equal, a backlight that emits light predominantly or exclusively in the useable polarization state is more efficient in an LCD application than a backlight that emits unpolarized light. Nevertheless, backlights that emit light that is not exclusively in the useable polarization state, even to the extent of emitting randomly polarized light, are still fully useable in LCD applications, since the non-useable polarization state can be easily eliminated by an absorbing polarizer provided at the back of the LCD panel.

BRIEF SUMMARY

The present application discloses, inter alia, reflective and/or transmissive films, surfaces, or other components that have a defined combination of diffuse and specular characteristics. These components are referred to herein as "semi-specular," and can be characterized by a quantity known as "transport ratio," which is a function of incidence angle. When properly placed within a suitable hollow recycling cavity backlight with an output surface (front surface) that has a high value of hemispheric reflectivity ($R^f_{hemi}$), they can help improve the output properties of the backlight and allow for the construction of backlights in new design spaces.

The application discloses, for example, backlights that include a front and back reflector forming a hollow light recycling cavity, the front reflector being partially transmissive to provide an output illumination area, and one or more light sources disposed to emit light into the light recycling cavity over a limited angular distribution. Significantly, the backlights also include a component that provides the cavity with a desired balance of specular and diffuse characteristics, the component being characterized by a transport ratio greater than 15% at a 15 degree incidence angle and less than 95% at a 45 degree incidence angle. The front or back reflectors can be or include the component, or the component can be distinct from the front and back reflectors. In some cases, the transport ratio of the component is greater than 20% at a 15 degree incidence angle, or less than 90% at a 45 degree incidence angle.

The light sources, which may include a small area LED source and a wedge-shaped reflector, may emit light into the light recycling cavity with a restricted or partially collimated angular distribution. For example, the injected light may be collimated to have a full angle-width at half maximum power (FWHM) centered about a transverse plane parallel to the backlight output area in a range from 0 to 60 degrees, or 0 to 30 degrees. In such cases, the front reflector of the recycling cavity desirably has a reflectivity that generally increases with angle of incidence, and a transmission that generally decreases with angle of incidence. Such reflectivity and transmission may be for unpolarized visible light in any plane of incidence, or for light of a useable polarization state incident in a plane for which oblique light of the useable polarization state is p-polarized.

In another aspect, the present disclosure provides a hollow light recycling cavity including a front and back reflector, the front reflector being partially transmissive to provide an output illumination area, where the cavity includes a cavity transport value of greater than about 0.5 and less than about 0.95, and further where the front reflector includes an $R_{hemi}$ of greater than about 0.6.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification reference is made to the appended drawings, where like reference numerals designate like elements, and wherein:

FIGS. 15a-b, 16, 17a-b, 19a-b, and 20a-b are plots of measured luminance vs. observation angle for other tested films; and FIGS. 18a-b are conoscopic plots of reflected light for the film of Examples G-H, where the film has a first orientation relative to the plane of incidence for Example G, and a second orientation relative to the plane of incidence for Example H, and the first orientation is rotated 90 degrees relative to the second orientation.

DETAILED DESCRIPTION OF THE ILLUSTRATIVE EMBODIMENTS

Figure 1:
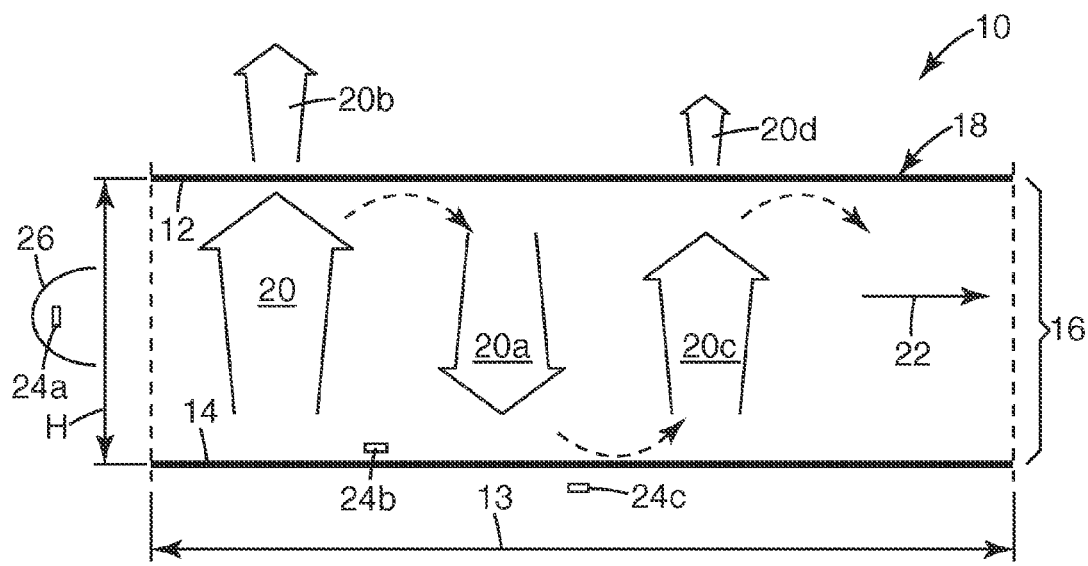
FIG. 1 is a schematic side view of a generalized recycling backlight or similar extended area source.

It would be beneficial for next generation backlights to combine some or all of the following characteristics while providing a brightness and spatial uniformity that is adequate for the intended application: thin profile; design simplicity, such as a minimal number of film components and a minimal number of sources, and convenient source layout; low weight; no use of or need for film components having substantial spatial non-uniformities from one position in the backlight to another (e.g., no significant gradation); compatibility with LED sources, as well as other small area, high brightness sources such as solid state laser sources; insensitivity to problems associated with color variability among LED sources that are all nominally the same color; to the extent possible, insensitivity to the burnout or other failure of a subset of LED sources; and the elimination or reduction of at least some of the limitations and drawbacks mentioned in the Background section above.

Whether these characteristics can be successfully incorporated into a backlight depends in part on the type of light source used for illuminating the backlight. CCFLs, for example, provide white light emission over their long narrow emissive areas, and those emissive areas can also operate to scatter some light impinging on the CCFL, such as would occur in a recycling cavity. The typical emission from a CCFL, however, has an angular distribution that is substantially Lambertian, and this may be inefficient or otherwise undesirable in a given backlight design. Also, the emissive surface of a CCFL, although somewhat diffusely reflective, also typically has an absorptive loss that Applicants have found to be significant if a highly recycling cavity is desired. An LED die also emits light in a Lambertian manner, but because of its much smaller size relative to CCFLs, the LED light distribution can be readily modified, e.g., with an integral encapsulant lens reflector, or extractor to make the resulting packaged LED a forward-emitter, a side-emitter, or other non-Lambertian profile. Such non-Lambertian profiles can provide important advantages for the disclosed backlights. However, the smaller size and higher intensity of LED sources relative to CCFLs can also make it more difficult to produce a spatially uniform backlight output area using LEDs. This is particularly true in cases where individual colored LEDs, such as arrangements of red/green/blue (RGB) LEDs, are used to produce white light, since failure to provide adequate lateral transport or mixing of such light can easily result in undesirable colored bands or areas. White light emitting LEDs, in which a phosphor is excited by a blue or UV-emitting LED die to produce intense white light from a small area or volume on the order of an LED die, can be used to reduce such color non-uniformity, but white LEDs currently are unable to provide LCD color gamuts as wide as those achievable with individual colored LED arrangements, and thus may not be desirable for all end-use applications.

Applicants have discovered combinations of backlight design features that are compatible with LED source illumination, and that can produce backlight designs that outperform backlights found in state-of-the-art commercially available LCD devices in at least some respects. These backlight design features include some or all of the following:

a recycling optical cavity in which a large proportion of the light undergoes multiple reflections between substantially coextensive front and back reflectors before emerging from the front reflector, which is partially transmissive and partially reflective;

overall losses for light propagating in the recycling cavity are kept extraordinarily low, for example, both by providing a substantially enclosed cavity of low absorptive loss, including low loss front and back reflectors as well as side reflectors, and by keeping losses associated with the light sources very low, for example, by ensuring the cumulative emitting area of all the light sources is a small fraction of the backlight output area;

a recycling optical cavity that is hollow, i.e., the lateral transport of light within the cavity occurs predominantly in air, vacuum, or the like rather than in an optically dense medium such as acrylic or glass;

in the case of a backlight designed to emit only light in a particular (useable) polarization state, the front reflector has a high enough reflectivity for such useable light to support lateral transport or spreading, and for light ray angle randomization to achieve acceptable spatial uniformity of the backlight output, but a high enough transmission into the appropriate application-useable angles to ensure application brightness of the backlight is acceptable;

the recycling optical cavity contains a component or components that provide the cavity with a balance of specular and diffuse characteristics, the component having sufficient specularity to support significant lateral light transport or mixing within the cavity, but also having sufficient diffusivity to substantially homogenize the angular distribution of steady state light within the cavity, even when injecting light into the cavity only over a narrow range of angles (and further, in the case of a backlight designed to emit only light in a particular (useable) polarization state, recycling within the cavity preferably includes a degree of randomization of reflected light polarization relative to the incident light polarization state, which allows a mechanism by which non-useable polarized light is converted into useable polarized light);

the front reflector of the recycling cavity has a reflectivity that generally increases with angle of incidence, and a transmission that generally decreases with angle of incidence, where the reflectivity and transmission are for unpolarized visible light and for any plane of incidence, and/or for light of a useable polarization state incident in a plane for which oblique light of the useable polarization state is p-polarized (and further, the front reflector has a high value of hemispheric reflectivity and while also having a sufficiently high transmission of application-useable light);

light injection optics that partially collimate or confine light initially injected into the recycling cavity to propagation directions close to a transverse plane (the transverse plane being parallel to the output area of the backlight), e.g., an injection beam having a full angle-width (about the transverse plane) at half maximum power (FWHM) in a range from 0 to 90 degrees, or 0 to 60 degrees, or 0 to 30 degrees. In some instances it may be desirable for the maximum power of the injection light to have a downward projection, below the transverse plane, at an angle with the transverse plane of no greater than 40 degrees, and in other instances, to have the maximum power of the injected light to have an upwards projection, above the transverse plane towards the front reflector, at an angle with the transverse plane of no greater than 40 degrees.

Backlights for LCD panels, in their simplest form, consist of light generation surfaces, such as the active emitting surfaces of LED dies or the outer layers of phosphor in a CCFL bulb, and a geometric and optical arrangement of distributing or spreading this light in such a way as to produce an extended- or large-area illumination surface or region, referred to as the backlight output area, which is spatially uniform in its emitted brightness. Generally, this process of transforming very high brightness local sources of light into a large-area uniform output surface results in a loss of light because of interactions with all of the backlight cavity surfaces, and interaction with the light-generation surfaces. To a first approximation, any light that is not delivered by this process through the output area or surface associated with a front reflector—optionally into a desired application viewer-cone (if any), and with a particular (e.g., LCD-useable) polarization state (if any)—is "lost" light. In a commonly assigned related application, we describe a methodology of uniquely characterizing any backlight containing a recycling cavity by two essential parameters. This related PCT Patent Application PCT/US08/64096 is entitled "Thin Hollow Backlights With Beneficial Design Characteristics".

We now turn our attention to a generalized backlight 10 shown in FIG. 1, in which a front reflector 12 and a back reflector 14 form a hollow light recycling cavity 16. The backlight 10 emits light over an extended output area or surface 18, which in this case corresponds to an outer major surface of the front reflector 12. The front and back reflectors are shown plane and parallel to each other, and coextensive over a transverse dimension 13, which dimension also corresponds to a transverse dimension such as a length or width of the output area 18. The front reflector reflects a substantial amount of light incident upon it from within the cavity, as shown by an initial light beam 20 being reflected into a relatively strong reflected beam 20a and a relatively weaker transmitted beam 20b. Note that the arrows representing the various beams are schematic in nature, e.g., the illustrated propagation directions and angular distributions of the different beams are not intended to be completely accurate.

Returning to the figure, reflected beam 20a is strongly reflected by back reflector 14 into a beam 20c. Beam 20c is partially transmitted by front reflector 12 to produce transmitted beam 20d, and partially reflected to produce another beam (not shown). The multiple reflections between the front and back reflectors help to support transverse propagation of light within the cavity, indicated by arrow 22. The totality of all transmitted beams 20b, 20d, and so on add together incoherently to provide the backlight output.

For illustrative purposes, small area light sources 24a, 24b, 24c are shown in alternative positions in the figure, where source 24a is shown in an edge-lit position and is provided with a reflective structure 26 that can help to collimate (at least partially) light from the source 24a. Sources 24b and 24c are shown in direct-lit positions, and source 24c would generally be aligned with a hole or aperture (not shown) provided in the back reflector 14 to permit light injection into the cavity 16. Reflective side surfaces (not shown, other than reflective structure 26) would typically also be provided generally at the endpoints of dimension 13, preferably connecting the front and back reflectors 12, 14 in a sealed fashion for minimum losses. In some direct-lit embodiments, generally vertical reflective side surfaces may actually be thin partitions that separate the backlight from similar or identical neighboring backlights, where each such backlight is actually a portion of a larger zoned backlight. Light sources in the individual sub-backlights can be turned on or off in any desired combination to provide patterns of illuminated and darkened zones for the larger backlight. Such zoned backlighting can be used dynamically to improve contrast and save energy in some LCD applications.

A backlight cavity, or more generally any lighting cavity, that converts line or point sources of light into uniform extended area sources of light can be made using a combination of reflective and transmissive optical components. In many cases, the desired cavity is very thin compared to its lateral dimension. Preferred cavities for providing uniform extended area light sources are those that create multiple reflections that both spread the light laterally and randomize the light ray directions. Generally, the smaller the area of the light sources compared to the area of the front face, the greater the problem in creating a uniform light intensity over the output region of the cavity.

Historically, solid light guides have generally been used for the thinnest backlights and, except for very small displays such as those used in handheld devices, have been illuminated with linearly continuous light sources such as cold cathode fluorescent lights (CCFLs). A solid light guide provides low loss transport of light and specular reflections at the top and bottom surfaces of the light guide via the phenomenon of total internal reflection (TIR) of light. As described elsewhere in this application, the specular reflection of light provides the most efficient lateral transport of light within a light guide. Extractors placed on the top or bottom surface of a solid light guide redirect the light in order to direct it out of the light guide, creating in essence, a partial reflector.

Solid light guides, however, present several problems for large displays, such as cost, weight, and light uniformity. The problem with uniformity for large area displays has increased with the advent of separate red/green/blue (RGB) colored LEDs, which are effectively point sources of light compared to the much larger area of the output region of the backlight. The high intensity point sources can cause uniformity problems with conventional direct-lit backlights as well as edge-lit systems that utilize solid light guides. The uniformity problems can be greatly reduced if a hollow light guide could be made that also provides for significant lateral transport of light as in a solid light guide. In some cases for polarization and light ray angle recycling systems, a hollow cavity can be more proficient at spreading light laterally across a display face than a solid cavity. Some of the components that can be used to accomplish this effectively for a hollow light guide have not generally been available to the backlight industry, or in cases where the components already existed, the hollow light guides have not until now been constructed in the correct fashion to make a uniform, thin, efficient hollow light mixing cavity.

An efficient hollow reflective cavity has several advantages over a solid light guide for making a thin uniform backlight, even though a solid light guide does provide efficient top and bottom reflectors via the phenomenon of Total Internal Reflection (TIR). The solid light guide is used primarily to provide a lateral dispersion of the light before the light interacts with other components such as reflective polarizers and other brightness enhancement films.

The TIR surfaces of a solid guide, however, are inadequate to meet all the needs of modern backlights, and additional light control films are typically added both above and below the solid light guide. Most systems that use a solid light guide today also use a separate back reflector to utilize brightness enhancement films such as BEF and DBEF. These films recycle light that is extracted from the light guide but is un-useable for the display because of unsuitable polarization or angle of propagation. The back reflector is typically a white reflector, which is substantially Lambertian in its reflection characteristics. Much of the lateral transport, however, is first achieved with the TIR surfaces of the solid guide, and the recycled light is converted and returned to the display with the Lambertian back reflector. If separate top and bottom light management films are required anyway, it can be more efficient to use them alone to create a hollow light guide and also to simultaneously provide the functions of a reflective polarizer and other brightness enhancement films. In this manner, the solid guide, as well as other brightness enhancement films, can be omitted.

We propose replacing the solid light guide with air, and the TIR surfaces of a solid light guide with high efficiency low-loss specular and semi-specular reflectors. As explained below, these types of reflectors can be important for facilitating optimal lateral transport of the light within the backlight cavity. Lateral transport of light can be initiated by the optical configuration of the light source, or it can be induced by an extensive recycling of light rays in a cavity that utilizes low loss semi-specular reflectors.

We can replace the TIR surfaces of the solid light guide with spatially separated low loss reflectors that fall into two general categories. One is a partial reflector for the front face and the second is a full reflector for the back and side faces. As described above, the latter are often added to solid light guide systems anyway. For optimal transport of light and mixing of light in the cavity, both the front and back reflectors may be specular or semi-specular instead of Lambertian. Further, a semi-specular component of some type may be useful somewhere within the cavity to promote uniform mixing of the light. The use of air as the main medium for lateral transport of light in large light guides enables the design of lighter, lower cost, and more uniform display backlights.

For a hollow light guide to significantly promote the lateral spreading of light, the means of light injection into the cavity is important, just as it is in solid light guides. The format of a hollow light guide allows for more options for injecting light at various points in a direct lit backlight, especially in backlights with multiple but optically isolated zones. In a hollow light guide system, the function of the TIR and Lambertian reflectors can be accomplished with the combination of a specular reflector and a semi-specular, forward scattering diffusion element. As explained below, excessive use of Lambertian scattering or reflecting elements is not considered optimal.

Exemplary partial reflectors (front reflectors) we describe here—particularly, for example, the asymmetric reflective films (ARFs) described in commonly assigned PCT Patent Application PCT/US08/64133 entitled BACKLIGHT AND DISPLAY SYSTEM USING SAME—provide for low loss reflections and also for better control of transmission and reflection of polarized light than is possible with TIR in a solid light guide alone. Thus, in addition to improved light distribution in a lateral sense across the face of the display, the hollow light guide can also provide for improved polarization control for large systems. Significant control of transmission with angle of incidence is also possible with the preferred ARFs mentioned above. In this manner, light from the mixing cavity can be collimated to a significant degree as well as providing for a polarized light output with a single film construction.

Preferred front reflectors have a relatively high overall reflectivity to support relatively high recycling within the cavity. We characterize this in terms of "hemispheric reflectivity," meaning the total reflectivity of a component (whether a surface, film, or collection of films) when light (of a wavelength range of interest) is incident on it from all possible directions. Thus, the component is illuminated with light incident from all directions (and all polarization states, unless otherwise specified) within a hemisphere centered about a normal direction, and all light reflected into that same hemisphere is collected. The ratio of the total flux of the reflected light to the total flux of the incident light for the wavelength range of interest yields the hemispheric reflectivity, $R_{hemi}$.

Characterizing a reflector in terms of its $R_{hemi}$ is especially convenient for recycling cavities because light is generally incident on the internal surfaces of the cavity—whether the front reflector, back reflector, or side reflectors—at all angles. Further, unlike the reflectivity for normal incidence, $R_{hemi}$ is insensitive to, and already takes into account, the variability of reflectivity with incidence angle, which may be very significant for some components (e.g., prismatic films).

In fact, some embodiments of front reflectors exhibit a (direction-specific) reflectivity that increases with incidence angle away from the normal (and a transmission that generally decreases with angle of incidence), at least for light incident in one plane. Such reflective properties cause the light to be preferentially transmitted out of the front reflector at angles closer to the normal, i.e., closer to the viewing axis of the backlight, and this helps to increase the perceived brightness of the display at viewing angles that are important in the display industry (at the expense of lower perceived brightness at higher viewing angles, which are usually less important). We say that the increasing reflectivity with angle behavior is "at least for light incident in one plane," because sometimes a narrow viewing angle is desired for only one viewing plane, and a wider viewing angle is desired in the orthogonal plane. An example is some LCD TV applications, where a wide viewing angle is desired for viewing in the horizontal plane, but a narrower viewing angle is specified for the vertical plane. In other cases, narrow angle viewing is desirable in both orthogonal planes so as to maximize on-axis brightness.

Figure 1A:
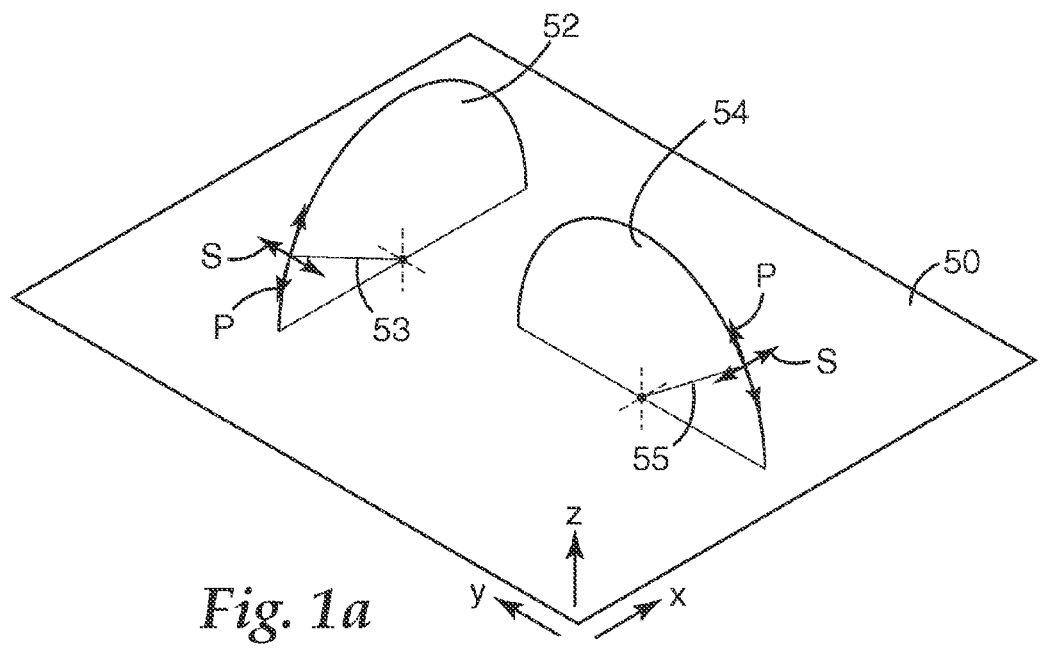
FIG. 1a is a perspective view of a surface, showing different planes of incidence and different polarization states.

When we discuss oblique angle reflectivity, it is helpful to keep in mind the geometrical considerations of FIG. 1a. There, we see a surface 50 that lies in an x-y plane, with a z-axis normal direction. If the surface is a polarizing film or partially polarizing film (such as the ARFs described in PCT/US08/64133, we designate for purposes of this application the y-axis as the "pass axis" and the x-axis as the "block axis." In other words, if the film is a polarizing film, normally incident light whose polarization axis is parallel to the y-axis is preferentially transmitted compared to normally incident light whose polarization axis is parallel to the x-axis. Of course, in general, the surface 50 need not be a polarizing film.

Light can be incident on surface 50 from any direction, but we concentrate on a first plane of incidence 52, parallel to the x-z plane, and a second plane of incidence 54, parallel to the y-z plane. "Plane of incidence" of course refers to a plane containing the surface normal and a particular direction of light propagation. We show in the figure one oblique light ray 53 incident in the plane 52, and another oblique light ray 55 incident in the plane 54. Assuming the light rays to be unpolarized, they will each have a polarization component that lies in their respective planes of incidence (referred to as "p-polarized" light and labeled "p" in the figure), and an orthogonal polarization component that is oriented perpendicular to the respective plane of incidence (referred to as "s-polarized light" and labeled "s" in the figure). It is important to note that for polarizing surfaces, "s" and "p" can be aligned with either the pass axis or the block axis, depending on the direction of the light ray. In the figure, the s-polarization component of ray 53, and the p-polarization component of ray 55, are aligned with the pass axis (the y-axis) and thus would be preferentially transmitted, while the opposite polarization components (p-polarization of ray 53, and s-polarization of ray 55) are aligned with the block axis.

With this in mind, let us consider the meaning of specifying (if we desire) that the front reflector "exhibit a reflectivity that generally increases with angle of incidence," in the case where the front reflector is an ARF such as is described in the PCT/US08/64133 application referenced elsewhere. The ARF includes a multilayer construction (e.g., coextruded polymer microlayers that have been oriented under suitable conditions to produce desired refractive index relationships, and desired reflectivity characteristics) having a very high reflectivity for normally incident light in the block polarization state and a lower but still substantial reflectivity (e.g., 25 to 90%) for normally incident light in the pass polarization state. The very high reflectivity of block-state light (p-polarized component of ray 53, and s-polarized component of ray 55) generally remains very high for all incidence angles. The more interesting behavior is for the pass-state light (s-polarized component of ray 53, and p-polarized component of ray 55), since that exhibits an intermediate reflectivity at normal incidence. Oblique pass-state light in the plane of incidence 52 will exhibit an increasing reflectivity with increasing incidence angle, due to the nature of s-polarized light reflectivity (the relative amount of increase, however, will depend on the initial value of pass-state reflectivity at normal incidence). Thus, light emitted from the ARF film in a viewing plane parallel to plane 52 will be partially collimated or confined in angle. Oblique pass-state light in the other plane of incidence 54 (i.e., the p-polarized component of ray 55), however, can exhibit any of three behaviors depending on the magnitude and polarity of the z-axis refractive index difference between microlayers relative to the in-plane refractive index differences, as discussed in the 63274WO004 application.

In one case, a Brewster angle exists, and the reflectivity of this light decreases with increasing incidence angle. This produces bright off-axis lobes in a viewing plane parallel to plane 54, which are usually undesirable in LCD viewing applications (although in other applications this behavior may be acceptable, and even in the case of LCD viewing applications this lobed output may be re-directed towards the viewing axis with the use of a prismatic turning film).

In another case, a Brewster angle does not exist or is very large, and the reflectivity of the p-polarized light is relatively constant with increasing incidence angle. This produces a relatively wide viewing angle in the referenced viewing plane.

In the third case, no Brewster angle exists, and the reflectivity of the p-polarized light increases significantly with incidence angle. This can produce a relatively narrow viewing angle in the referenced viewing plane, where the degree of collimation is tailored at least in part by controlling the magnitude of the z-axis refractive index difference between microlayers in the ARF.

Of course, the reflective surface 50 need not have asymmetric on-axis polarizing properties as with ARF. Symmetric multilayer reflectors, for example, can be designed to have a high reflectivity but with substantial transmission by appropriate choice of the number of microlayers, layer thickness profile, refractive indices, and so forth. In such a case, the s-polarized components of both ray 53 and 55 will increase with incidence angle in the same manner with each other. Again, this is due to the nature of s-polarized light reflectivity, but the relative amount of increase will depend on the initial value of the normal incidence reflectivity. The p-polarized components of both ray 53 and ray 55 will have the same angular behavior as each other, but this behavior can be controlled to be any of the three cases mentioned above by controlling the magnitude and polarity of the z-axis refractive index difference between microlayers relative to the in-plane refractive index differences, as discussed in the 63274WO004 application.

Thus, we see that the increase in reflectivity with incidence angle (if present) in the front reflector can refer to light of a useable polarization state incident in a plane for which oblique light of the useable polarization state is p-polarized. Alternately, such increase in reflectivity can refer to the average reflectivity of unpolarized light, in any plane of incidence.

Preferred back reflectors also have a high hemispherical reflectivity for visible light, typically, much higher than the front reflector since the front reflector is deliberately designed to be partially transmissive to provide the required light output of the backlight. The hemispherical reflectivity of the back reflector is referred to as $R^b_{hemi}$, while that of the front reflector is referred to as $R^f_{hemi}$. It may be preferred that the product $R^f_{hemi} * R^b_{hemi}$ is at least 70% (0.70), or 75%, or 80%.

There are several key aspects to the design of a hollow light recycling cavity that are relevant to spreading light efficiently and uniformly from small area sources to the full area of the output region. These are 1) proper directional injection of light into the cavity from the light source; 2) the use of forward scattering diffusers or semi-specular reflecting surfaces or components within the cavity; 3) a front reflector that transmits the light, but which is also substantially reflective such that most light rays are recycled many times between the front and back reflector so as to eventually randomize the light ray directions within the cavity; and 4) minimizing losses by optimal component design.

Conventional backlights have used one or more of these techniques to enhance the uniformity of the backlight, but never all four simultaneously in the correct configuration for a thin and hollow backlight having very small area light sources. These aspects of cavity design are examined in more detail herein.

Figure 2:
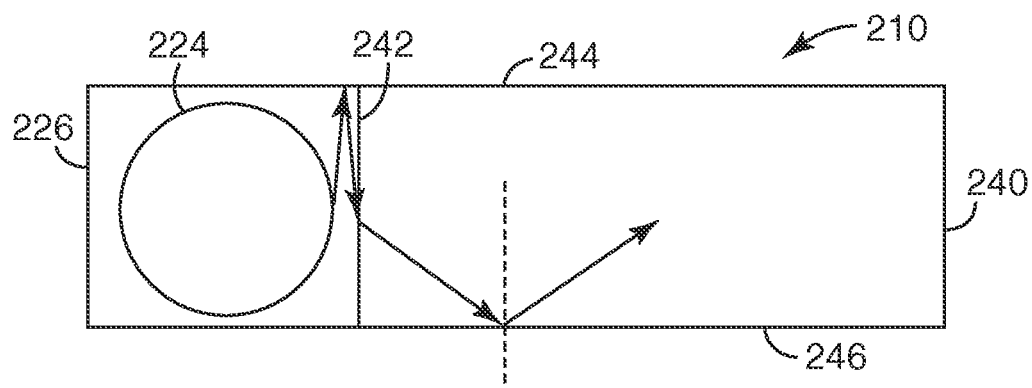
FIG. 2 is a schematic side view of an edge-lit backlight containing a solid light guide.
Figure 10:
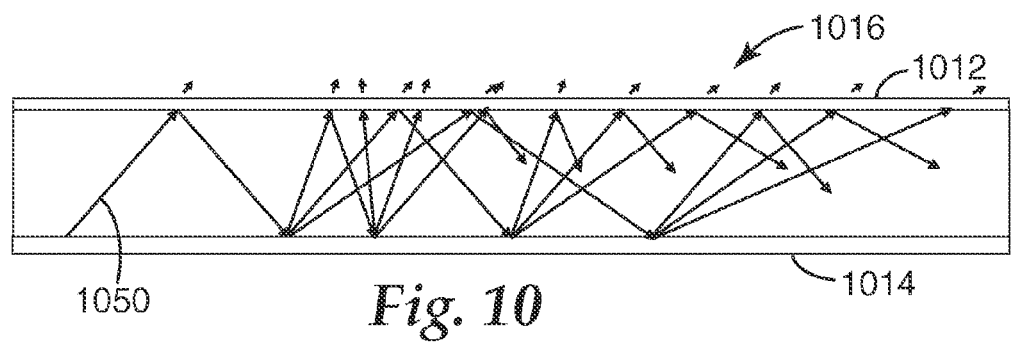

With regard to the injection of light from the light source into the cavity, hollow light guides have a significantly different requirement for light injection compared to solid light guides. For example, the edge-lit solid guide as shown in FIG. 10 of U.S. Pat. No. 6,905,220 (Wortman et. al.) illustrates edge injection into a solid guide simply by placing a fluorescent tube against one edge of the solid light guide. An analogous arrangement of a backlight 210 is shown in FIG. 2 of the present application. The fluorescent tube 224 is a Lambertian emitter, i.e., light emanates equally in all directions. Wrapping ¾ of the tube with a mirror 226 again produces a Lambertian light field incident on the flat vertical edge 242 of the solid light guide 240. A simple application of Snell's law shows that even the highest angle rays (+/−90 deg) incident on that surface (and transmitted to the interior of the solid guide) will all be totally internally reflected upon their first encounter with a front or back surface 244, 246, unless they encounter an extraction feature. In this manner, light rays are transported efficiently across the solid light guide 240.

Figure 3:
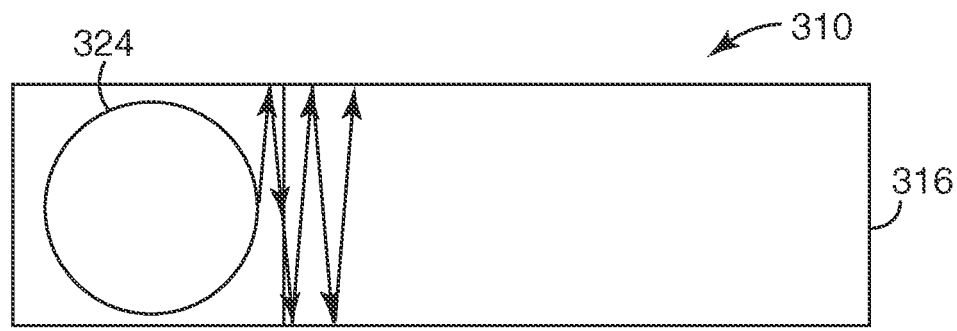
FIG. 3 is a schematic side view of an edge-lit backlight containing a hollow recycling cavity.

If the solid light guide is replaced with a hollow light guide, none of the light rays are refracted upon entering the hollow guide. With a Lambertian distribution of light rays entering from one edge, there will be a large amount of light directed in the vertical direction (towards the front reflector), as illustrated in FIG. 3, where backlight 310 includes a hollow light guide 316 and a fluorescent tube 324. To make a uniform backlight, the partially reflective film should be extremely reflective near the source and then have a highly graded transmissivity across the face of the cavity—more than what is needed with the graded extraction pattern of a solid guide.

Figure 4:
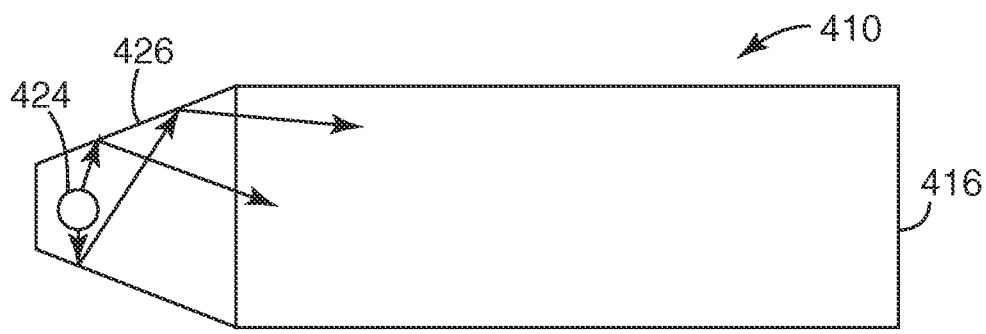
FIG. 4 is a schematic side view of an edge-lit backlight containing a hollow recycling cavity and a light source member disposed to emit light into the cavity over a limited angular distribution.

A more uniform hollow backlight can be made by using a partially collimated light source, or a Lambertian source with collimating optical means, to produce a highly directional source that promotes the lateral transport of light. An example of such a light injector 426 is shown in FIG. 4, where backlight 410 includes a hollow light guide 416, one or more light sources 424, and injector 426. Examples of other suitable light injectors are described in commonly assigned PCT Patent Application PCT/US08/64123 entitled COLLIMATING LIGHT INJECTORS FOR EDGE-LIT BACKLIGHTS. Any suitable technique can be utilized to provide the desired degree of collimation and angle of injection of light from the light sources, e.g., compound parabolic concentrator-shaped light injectors, lenses, extractors, etc.

In some embodiments, the light rays are preferably injected into a hollow light guide with a predominantly horizontal direction, i.e., having a collimation characteristic that provides a small angle-width at half maximum (FWHM), with the light collimated with a degree of symmetry about the transverse plane. Some finite distribution of ray angles cannot be avoided, and this distribution can be optimized by the shape of the collimating optics in conjunction with the emission pattern of the light source to help provide uniformity of the light across the output area of the cavity. The partially reflecting front reflector and the partial diffusion of the semi-specular reflector produce a light recycling and randomizing light cavity that works in harmony with the injection light sources optics to create a uniform, thin, and efficient hollow light guide.

In some embodiments, brightness uniformity of an edge-lit backlight can be enhanced by aiming the injection light output direction, adjusting spacing between adjacent light sources or groups of light sources, or a combination of the two techniques. For example, forward emitting light sources having narrow light distribution cone angles as described herein can be selected as a way of controlling the direction of light emitted by the light sources. Typically, for edge-lit backlights, the light sources can be arranged along one or more edges of a backlight such that the emitted beams are directed substantially perpendicular to the input edge or edges and parallel to each other. By aiming the beams of one or more light sources in a non-perpendicular direction and towards selected areas of the backlight, the brightness of the selected area can be increased with a corresponding brightness decrease in other areas.

For example, in a backlight having several LEDs uniformly disposed along one edge, the LEDs can be aimed such that all of the beams intersect at the approximate center of the backlight, thus resulting in a bright center and less bright edges. If fewer than all of the beams are directed to intersect at the center, the center brightness can be decreased, thereby providing a mechanism to adjust the brightness to a desired level. Analogous arrangements can be used to produce, for example, brighter edges and a less bright center. Any suitable technique can be used to control the emission direction of the light sources, e.g., mounting orientation of the light sources, lenses, extractors, collimating reflectors, etc. In general, the light sources can be aimed such that the light is predominantly directed at any suitable angle relative to the transverse plane, including 0 degrees.

Light sources can also be arranged along one or more edges of a backlight such that spacing between them is non-uniform. In this situation, the part of the backlight having more closely spaced light sources will be brighter. For example, in a backlight having 40 LEDs disposed along one edge, the center 20 LEDs can be more closely spaced than the flanking 10 LEDs towards each edge, thus producing a brighter center. Analogous adjustments can be used to produce brighter edges.

In some embodiments, one or more optical elements can be positioned between the light sources and the entrance to the cavity. Any suitable optical element can be included. For example, one or more absorptive or reflective filters can be positioned between the light sources and the cavity to inject a desired light flux distribution into the cavity. Other types of filters can be provided to reduce or remove UV or short wavelength light from the injected light to reduce photodegradation in the backlight cavity materials. Other suitable film or films include multilayer optical films (e.g., DBEF, APF, asymmetric reflective films), light redirecting films (e.g., BEF), etc.

Further, for example, the optical element can include a film or layer having a phosphor coating to convert light from one or more light sources having one particular optical characteristic (e.g., wavelength) into a second optical characteristic. See, e.g., U.S. Pat. No. 7,255,469 (Wheatley et al.), entitled PHOSPHOR BASED ILLUMINATION SYSTEM HAVING A LIGHT GUIDE AND AN INTERFERENCE REFLECTOR.

The one or more optical elements can also include any suitable structure or structures to modify the direction of the light that is injected into the cavity, e.g., refractive structures, reflective structures, and diffractive structures.

Figure 5:
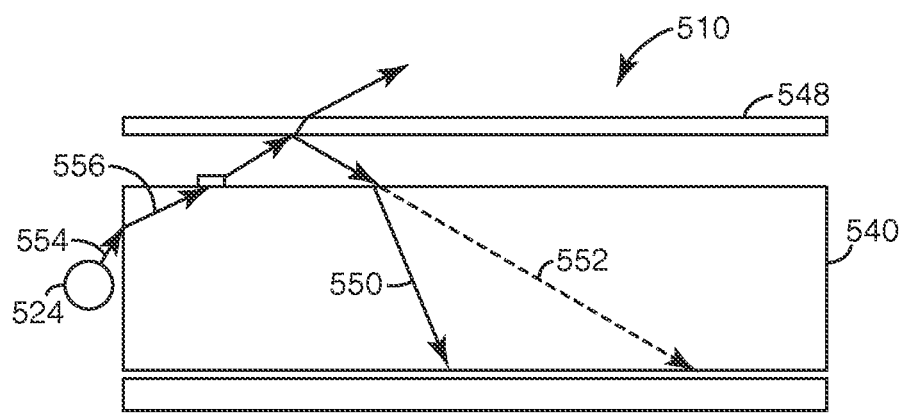
FIG. 5 is a schematic side view of an edge-lit backlight containing a solid light guide, demonstrating light injection principles.
Figure 6:
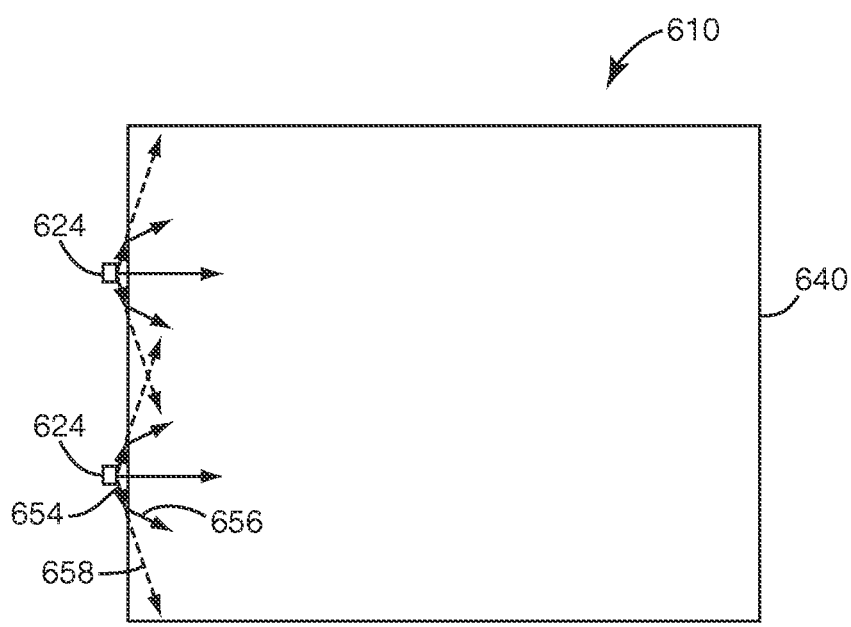
FIG. 6 is a schematic top view of an edge-lit backlight containing a solid light guide, also demonstrating light injection principles.

We now discuss some advantages of hollow cavities over solid light guides. Even though light can move large distances laterally in a low loss solid light guide, light that exits the light guide and is recycled for polarization or angle conversion cannot thereafter participate in substantial lateral spreading of light. The reason is best explained with the ray diagram shown in FIG. 5, which depicts a schematic side view of a backlight 510 containing a solid light guide 540. Light ray 550 is refracted towards the normal as it re-enters the light guide 540 after reflection by a partial reflecting film 548. If the light guide 540 were hollow, the ray would proceed on path 552 that would offer a much greater lateral propagation of the light ray. This effect is substantial for light rays entering the light guide 540 from air at angles of about 30 degrees or more. If the light ray were to re-enter the solid light guide 540 at another extraction dot, which scatters the light over many angles, some of the light would be spread laterally at high angles, but some would re-enter at very small angles. The net effect is a decreased lateral propagation of the light. Referring still to FIG. 5, the refraction of the initial light ray 554 towards the lateral direction upon transmission as light ray 556 would appear to offer a significant advantage to a solid light guide system for spreading light laterally. However, this is true only for one cross-sectional plane or perspective. By viewing the system from above (i.e., from the front of the backlight), as shown in the plan view of FIG. 6, one can see that a hollow light guide is superior for providing uniform light intensity along a direction orthogonal to the plane of FIG. 5. Light ray 654 in FIG. 6 is refracted toward the local surface normal to produce light ray 656, causing it to spread very little in the direction parallel to the left edge (from the perspective of FIG. 6) of the light guide 640. If the light guide 640 of FIG. 6 were hollow, then light ray 654 would not be refracted into the path of light ray 656. Instead, it would follow path 658, thereby better filling in the "gaps" between the point light sources at the edge of the light guide.

FIGS. 2-6 depict edge-lit systems, but the same principles apply to direct-lit systems. For direct-lit systems, the light sources are either inside the cavity, or a hole or portal is made in the back reflector through which the light can enter the cavity from a source. In either case, an opening is made in the back reflector, preferably as small as possible, so that the light source can be inserted or its light can pass through the back reflector with minimal effect on the overall average reflectivity of the back reflector.

In direct-lit systems, it is generally preferable that only small amounts of the light from a given light source are directly incident on the front reflector in regions of the output area directly opposing that source. One approach for achieving this is a packaged LED or the like designed to emit light mostly in the lateral directions. This feature is typically achieved by the optical design of the LED package, specifically, the encapsulant lens. Another approach is to place a localized reflector above the LED to block its line of sight of the front reflector. Any high efficiency mirror can be used for this purpose. Preferably, the mirror is curved in a convex shape so as to spread the reflected light away from the source so it is not reabsorbed. This arrangement also imparts substantial lateral components to the light ray direction vectors. A refractive element such as a lens or a Fresnel lens having a negative focal length (i.e., a diverging lens) may be used for this purpose as well. Still another approach is covering the light source with a piece of a reflective polarizer that is misaligned with respect to a polarization pass axis of the front reflector. The light transmitted by the local reflective polarizer proceeds to the front reflector where it is mostly reflected and recycled, thereby inducing a substantial lateral spreading of the light. Reference is made in this regard to commonly assigned U.S. Patent Publication No. 2006/0187650 (Epstein et al.), entitled DIRECT LIT BACKLIGHT WITH LIGHT RECYCLING AND SOURCE POLARIZERS.

There may be instances where Lambertian emitting LEDs are preferred in a direct-lit backlight for reasons of manufacturing cost or efficiency. Individual light deflection devices may not be preferred for similar reasons. Good uniformity may still be achieved with such a cavity by imposing a greater degree of recycling in the cavity. This may be achieved by using a front reflector that is even more highly reflective, e.g., having less than about 10% or 20% total transmission and conversely 90% or 80% reflection. For a polarized backlight, this arrangement further calls for a block axis of the front reflector having a very low transmission on the order of 1% to 2% or less. An extreme amount of recycling, however, may lead to unacceptable losses in the cavity.

Figure 7:
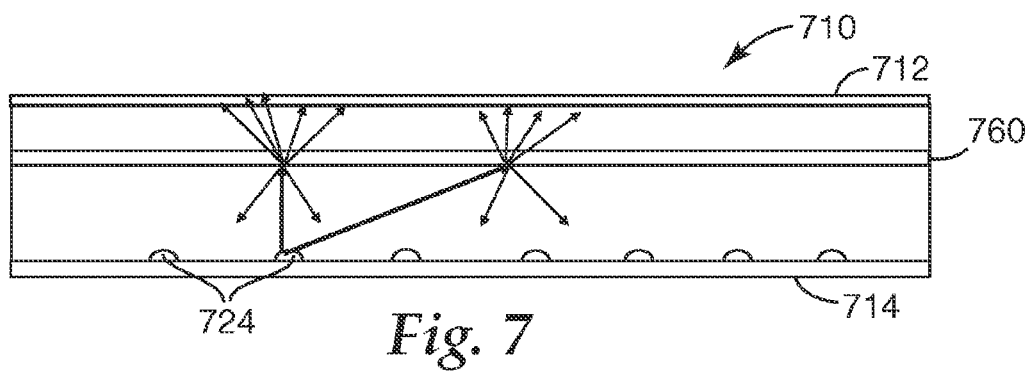
FIG. 7 is a schematic side view of a direct-lit backlight containing a hollow recycling cavity.

If localized reflectors or deflectors are unacceptable as a solution to hiding Lambertian light sources, a third component 760 that is coextensive with the front and back reflectors 712, 714 can be added to the cavity 716, as shown in FIG. 7. This third component 760 can be a diffuser, such as a standard volume diffuser, a close-packed array of diverging Fresnel lenses, or another partial reflector. This third component 760 need not be polarizing if the front reflector 712 is polarizing. If lens arrays are used, the lenses can be linear, circular, elliptical, or any suitable shape. Linear lenses are useful for spreading light in a direction perpendicular to a row of LEDs. Whatever is used for the third component, it is preferably constructed of very low loss materials since it is being used within a cavity between very reflective surfaces, and the recycled light will pass through this component many times.

Having reviewed some of the benefits and design challenges of hollow cavities relative to solid light guides, we now turn to a detailed explanation and exposition of semi-specular reflective and transmissive components, and advantages of using them rather than solely Lambertian or specular components in hollow recycling cavity backlights.

Figure 8:
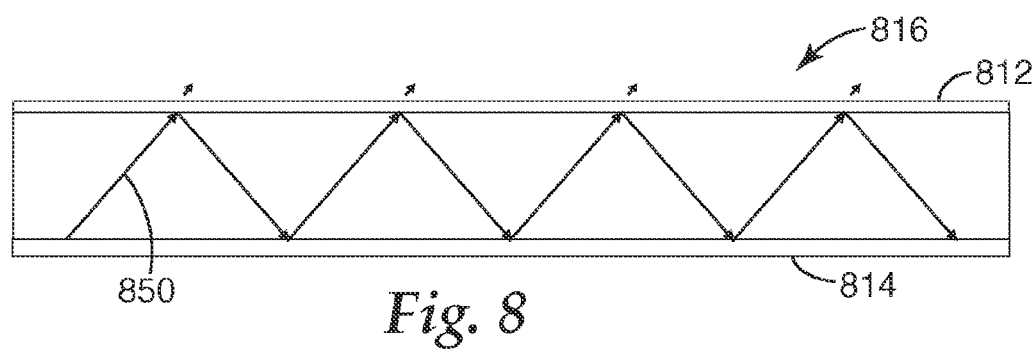
FIGS. 8-10 are schematic side views of backlights containing a hollow recycling cavity, comparing the effects of specular, Lambertian, and semi-specular reflectors.

A pure specular reflector, sometimes referred to as a mirror, performs according to the optical rule that "the angle of incidence equals the angle of reflection." This is seen in the hollow cavity 816 of FIG. 8. There, the front and back reflectors, 812, 814 are both purely specular. A small portion of an initially launched oblique light ray 850 is transmitted through the front reflector 812, but the remainder is reflected at an equal angle to the back reflector 814, and reflected again at an equal angle to the front reflector 812, and so on as illustrated. This arrangement provides maximum lateral transport of the light across the cavity 816, since the recycled ray is unimpeded in its lateral transit of the cavity 816. However, no angular mixing occurs in the cavity, since there is no mechanism to convert light propagating at a given incidence angle to other incidence angles.

A purely Lambertian reflector, on the other hand, redirects light rays equally in all directions. This is seen in the hollow cavity 916 of FIG. 9, where the front and back reflectors 912, 914 are both purely Lambertian. The same initially launched oblique light ray 950 is immediately scattered in all directions by the front reflector 912, most of the scattered light being reflected back into the cavity 916 but some being transmitted through the front reflector 912. Some of the reflected light travels "forward" (generally to the right as seen in the figure), but an equal amount travels "backward" (generally to the left). By forward scattering, we refer to the lateral or in-plane (in a plane parallel to the scattering surface in question) propagation components of the reflected light. When repeated, this process greatly diminishes the forward directed component of a light ray after several reflections. The beam is rapidly dispersed, producing minimal lateral transport.

A semi-specular reflector provides a balance of specular and diffusive properties. In the hollow cavity 1016 of FIG. 10, the front reflector 1012 is purely specular but the back reflector 1014 is semi-specular. The reflected portion of the same initially launched oblique light ray 1050 strikes the back reflector 1018, and is substantially forward-scattered in a controlled amount. The reflected cone of light is then partially transmitted but mostly reflected (specularly) back to the back reflector 1014, all while still propagating to a great extent in the "forward" direction.

Semi-specular reflectors can thus be seen to promote the lateral spreading of light across the recycling cavity, while still providing adequate mixing of light ray directions and polarization. Reflectors that are partially diffuse but that have a substantially forward directed component will transport more light across a greater distance with fewer total reflections of the light rays. In a qualitative way, we can describe a semi-specular reflector as one that provides substantially more forward scattering than reverse scattering. A semi-specular diffuser can be defined as one that does not reverse the normal component of the ray direction for a substantial majority of the incident light, i.e., the light is substantially transmitted in the forward (z) direction and scattered to some degree in the x and y directions. A more quantitative description of semi-specular is given below in connection with the examples.

Figure 9:
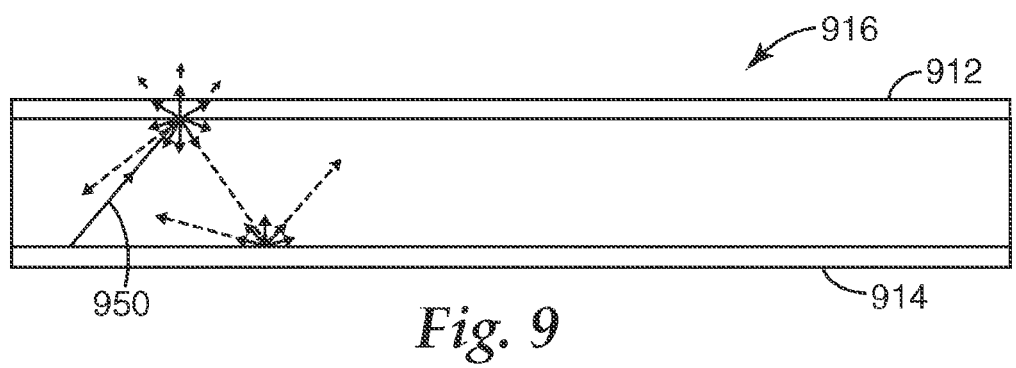
Figure 11:
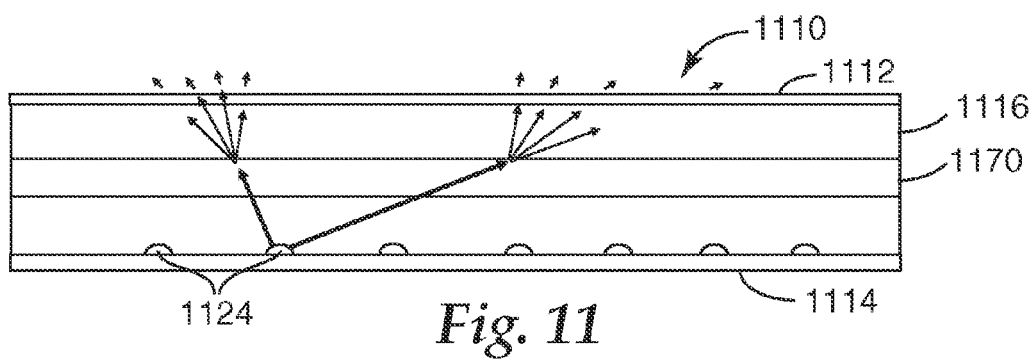
FIG. 11 is a schematic side view of a direct-lit backlight containing a hollow recycling cavity.

FIGS. 8-10 illustrate cavity designs that use only two major optical components: the front and back reflectors. In this case, at least one of the reflectors should be semi-specular. The other can be specular, or semi-specular, or even Lambertian, although semi-specular is advantageous for efficiency and uniformity. As an alternative to the two-component systems of FIG. 10, additional optical components can be inserted into the recycling cavity between the front and back reflectors, and such additional components may be tailored to provide the desired degree of semi-specularity to the cavity. A simple example is shown in FIG. 11. In this case a semi-specular diffusing film 1170 is suspended in the cavity 1116 between the front and back reflectors 1112, 1114, both of which can be specular or semi-specular. Although it is often desirable to minimize the number of components in the cavity, the use of a third component can sometimes provide a higher efficiency cavity by allowing for the minimal loss design of the front or back reflector.

The mixing of light rays in the cavity with forward scattering elements can be accomplished in several ways. It can be done by diffusing elements that are either an integral part of the front or back reflector or are laminated to the front or back reflector, or by use of a separate diffusing sheet placed anywhere between the two, as shown in FIG. 11. Combinations of any of these options are also possible. The choices depend on the relative importance of matters such as optical losses, component cost, and convenience of manufacturing. The diffusing element may be attached to or an integral part of either the front or back reflector, or an air gap may be provided between the diffuser and the reflectors.

Whether the diffuser is an integral part of either reflector, or laminated to either reflector, or placed in the cavity as a separate component, the overall desired optical performance is one with an angular spreading function that is substantially narrower than a Lambertian distribution for a ray that completes one round trip passage from the back reflector to the front and back again. A semi-specular reflector can have characteristics of both a specular and a Lambertian reflector or can be a well defined Gaussian cone about the specular direction. The performance depends greatly on how it is constructed. Keeping in mind that the diffuser component can also be separate from the reflector, several possible constructions exist for the back reflector, such as (1) partial transmitting specular reflector plus a high reflectance diffuse reflector; (2) partial Lambertian diffuser covering a high reflectance specular reflector; (3) forward scattering diffuser plus a high reflectance specular reflector; or (4) corrugated high reflectance specular reflector.

For each numbered construction, the first element listed is arranged to be inside the cavity. The first element of constructions (1) through (3) can be continuous or discontinuous over the area of the back reflector. In addition, the first element could have a gradation of diffuser properties, or could be printed or coated with additional diffuser patterns that are graded. The graded diffuser is optional, but may be desirable to optimize the efficiency of various backlight systems. The term "partial Lambertian" is defined to mean an element that only scatters some of the incident light. The fraction of light that is scattered by such an element is directed almost uniformly in all directions. In construction (1), the partial specular reflector is a different component than that utilized for the front reflector. The partial reflector in this case can be either a spatially uniform film of moderate reflectivity, or it can be a spatially non-uniform reflector such as a perforated multilayer or metallic reflector. The degree of specularity can be adjusted either by changing the size and number of the perforations, or by changing the base reflectivity of the film, or both.

Construction (4) can be made by thermally embossing a multilayer polymeric mirror film, or by physically corrugating such a film. Additionally, any surface with these shapes can be coated with a metallic or enhanced metal reflective film. Furthermore, the semi-specular constructions of (1) through (3) can be corrugated or embossed in order to optimize their light transport properties.

The front reflector of the recycling cavity can be made semi-specular with constructions that are similar to the back reflector, but with some notable differences. Some constructions are (a) a partial reflecting Lambertian diffuser plus a partial specular reflector; (b) a forward scattering diffuser plus a partial specular reflector; (c) a forward scattering partial reflector; or (d) various combinations of (a) through (c).

The elements of these constructions can be continuous or discontinuous over the area of the front reflector. For example, such elements could have a gradation of diffusing or reflecting properties, or both. They could be printed or coated with patterns that are graded. A graded diffuser is optional but may be desirable to optimize the efficiency of various backlight systems. The term "partial Lambertian" refers to an element that only scatters some of the incident light into a Lambertian pattern, the rest being scattered into some other angular distribution, such as specular.

Again, the first element listed is arranged to be inside the recycling cavity. The first element of all three constructions can be continuous or discontinuous over the area of the partial reflector, and the first element can have a gradation of diffuser properties, or can be printed or coated with additional diffuser patterns that are graded.

One or both of the front and back reflectors can be specular if a diffuser is placed somewhere in the cavity. One of the reflectors can also be Lambertian, but in general this is not an optimum construction, particularly for edge-lit backlights. In this case, the other reflector should be semi-specular or specular. The forward scattering diffusers can be either a surface or a volume diffuser, and can be symmetric or asymmetric with respect to both direction or polarization state.

Quantitatively, the degree of semi-specularity (specular vs. Lambertian characteristic of a given reflector or other component) can be effectively characterized by comparing the fluxes of the forward- and back-scattered light components, referred to as F and B respectively. The forward and back-scattered fluxes can be obtained from the integrated reflection intensities (or integrated transmission intensities in the case of optically transmissive components) over all solid angles. The degree of semi-specularity can then be characterized by a "transport ratio" T, given by $$T=(F-B)/(F+B).$$

T ranges from 0 to 1 as one moves from purely specular to purely Lambertian. For a pure specular reflector there is no back-scatter (B=0), and therefore T=F/F=1. For a pure Lambertian reflector, the forward- and back-scattered fluxes are the same (F=B), and thus T=0. Examples with experimentally measured values are given below. The transport ratio for any real reflective or transmissive component is a function of incidence angle. This is logical, because one would expect the amount of forward-scattered light, for example, to be different for a near-normally incident ray than for a grazing-incident ray.

In connection with a recycling cavity, one can define an "effective cavity transport ratio," i.e., the transport ratio experienced by a given incident ray after a complete circuit or cycle of the recycling cavity. This quantity may be of interest, particularly in cavities that contain at least one semi-specular component and at least one additional scattering component (whether semi-specular or Lambertian). Since transport ratio is in general a function of incidence angle, one could evaluate or specify the effective cavity transport ratio in terms of the FWHM property of the collimated light injected into the cavity.

The transport ratio is well defined for a single interaction of a light ray at one angle with a reflector or a diffuser. A good recycling cavity creates multiple interactions of a light ray at all angles with at least two reflecting or diffusing components, and perhaps three or more such components. Since the transport ratio for a single interaction is a function of the angle of incidence, the description of an overall cavity transport ratio is therefore more complex than for a single component. An "effective cavity transport ratio" or more descriptively a "cavity transport value," is a measure of how well a cavity can spread injected light from the injection point to distant points in the cavity and still randomize it sufficiently to direct light uniformly towards a viewer. A simple method of estimating relative cavity transport values is useful for judging the comparative merits of various combinations of specular, semi-specular, and Lambertian components. For this purpose, we define the forward transport number fT for each component, which is expressed as $$fT=F/(F+B),$$

where F and B are defined and measured as described herein but now averaged over all angles of a single interaction. Measurements at intervals of about 15 degrees or less from 15 to 75 degrees angle of incidence are sufficient to give a proper average. F and B are the relative fractions of forward and backscattered light and by definition, F+B=1, giving simply fT=F which is the fraction of forward scattered light. The cavity transport value CT is then the product of the F values of the front and back reflector of the cavity:

$$CT=F_{front}*F_{back}.$$

For example, a specular front reflector ($F_{front}=1$) and a semi-specular back reflector ($F_{back}=0.75$, and a transport ratio of T=0.5) have an overall cavity transport value of CT=1*0.75=0.75.

As another example, if the front reflector is Lambertian so that $F_{front}=0.5$ (T=0) and the back reflector is semi-specular so that $F_{back}=0.75$ (T=0.5), then the overall cavity transport value is CT=0.5*0.75=0.375. One would expect the latter cavity to transport much less light to a given distance from the injection point than the first example cavity. This prediction is confirmed by experiment as described herein.

For some applications, the front reflector may consist of a stack of several components, such as a specular or a semi-specular reflector followed by a light redirecting layer or one or more diffusers that may or may not be laminated to each other. The front and back reflectors each can be defined as a collection of components assembled in a specific order. The collective transport properties of all components that make up the front reflector or the back reflector can be determined with one measurement. The effect of an individual component (e.g., a film) on the transport properties of a stack of components depends on the component's sequence and orientation in the stack and the properties of the other components in the stack. For at least these reasons, the stack can be measured as a whole. The components of the front reflector can be placed in the measuring device, such as the ones made by Autronics and by Radiant Imaging (Duvall, Wash., USA), with the inside cavity surface facing the measuring light beam.

The measurement of F and B described above for semi-specular reflectors is done in reflection mode, which means that portions of the incident beam pass through the diffuse layer twice or reflect from it once. If the diffuser were an intermediate component positioned somewhere in the cavity between the front and back reflectors, then light rays pass through it twice in making one front to back cycle during the transport process. For this reason, we define the F and B values of an intermediate component as those measured in the same manner as a diffuser coated on a mirror. The intermediate component can be grouped with either the front or the back reflector, and the combined transport properties of the intermediate component and the chosen reflector can be measured together. If the majority of the light is injected into the cavity above an intermediate component (or though-holes in it from below), then the intermediate component can be grouped with the bottom reflector. If the majority of light is injected below an intermediate component, then the intermediate component can be grouped with the front reflector for transport measurement.

A cavity is defined as being semi-specular if the product CT is greater than about 0.5 and less than about 0.95 along at least one azimuthal (in-plane) direction within the cavity. In some embodiments, it may be preferred that the semi-specular cavity have a CT that is greater than about 0.6. In other embodiments, it may be preferred that the semi-specular cavity have a CT that is greater than about 0.7.

If an intermediate component is not entirely co-extensive with the front and back reflectors, then the overall cavity transport CT can be taken to be a weighted average of the CT values of the different areas of the cavity that contain the different components.

With most common diffusers, T ranges between 0 and 1 and F ranges from 0.5 to 1.0. However, if a material that possesses some retroreflective properties is used as a diffuser, T can be negative and can range from 0 to −1 and F can range from 0 to 0.5. Examples of retroreflective materials include glass beads and prismatic structures with 90 degree, or near 90 degree angled facets. Solid prism arrays on a planar substrate (e.g., BEF) are retroreflective for light incident on the planar side in the plane perpendicular to the linear direction of the prisms, but only over a limited range of angles such as less than +1-10 degrees.

Hollow 90 degree faceted structures with specularly reflective individual facets are retroreflective for the entire angle range of 0 to 45 degrees and additionally have a forward transport of zero for all angles of incidence between 0 and 90 degrees for the direction perpendicular to the groove direction.

Asymmetric components such as BEF and its many variations, or asymmetric diffusing materials such as blends or holographic structures, can create different cavity transport values along various directions.

The values of CT obtained by multiplying the values of F are only relative measures of the transport properties of a cavity. The numerical values of light intensity as a function of distance from the source also depend on cavity geometry and the reflectivity of the front and the back reflectors. The higher the reflectivity of the reflectors, the further the light can be transported within the cavities. In exemplary embodiments, $R_{hemi}$ can be greater than 0.6 or even greater than 0.8 for the front reflector, and greater than about 0.95 for the back reflector.

Cavity transport values were measured with an experimental cavity using different combinations of specular (e.g., ESR, average T≈1), semispecular-1 (e.g., BEF-III on ESR with an air gap, average of T≈0.67 perpendicular to the prism length axis), semi-specular-2 (e.g., bead coated ESR, average T≈0.4) and Lambertian (e.g., TIPS, average T 0.02) reflectors as the front and back reflectors. Both the front and back reflectors were chosen in this experiment to have high reflectivity to eliminate the complexity of variable light loss along the length of the cavity. In this way, the light transport properties are the only major variable between samples.

Light was injected into one open end of a four inch wide cavity (½ inch high and 12 inches long) using a green laser that was aimed at 30 degrees below the horizontal. A large area amorphous silicon solar cell covered the other end of the cavity and served as a light detector when connected in series with an ammeter. The relative cavity transport, as measured by the amount of light collected by the detector at the end of the cavity, decreased in the following order as one would expect from the above analysis: (specular/specular)>(semi-specular/specular)>(Lambertian/specular)>(semi-specular/semi-specular)>(semi-specular/Lambertian)>(Lambertian/Lambertian). The second listed component was the bottom reflector, toward which the laser light was first directed. The order of some of these combinations may change depending on the value of T for various other semi-specular components. The relative intensities, normalized to the (ESR/ESR) case, which gave by far the highest transport values, are listed in the following table. Note that the measured intensity is not linear with the calculated values of CT. This is expected because the actual intensity depends on many factors as described above. The CT values, however, give a good prediction of relative intensity in various cavity constructions for transporting light.

| Top/Bottom reflector types | Top Reflector | $F_{top}$ | Bottom Reflector | $F_{Bottom}$ | CT | Measured light intensity |
| --- | --- | --- | --- | --- | --- | --- |
| Specular/specular* | ESR | 1 | ESR | 1 | 1.00 | 1 |
| Semi-specular-1/specular | ESR-BEF-III | 0.83 | ESR | 1 | 0.83 | 0.226 |
| Semi-specular-2/specular | Beaded ESR | 0.7 | ESR | 1 | 0.70 | 0.163 |
| Semi-specular/semi-specular | ESR-BEF-III | 0.83 | Beaded ESR | 0.7 | 0.58 | 0.058 |
| Lambertian/specular | 1 TIPs film | 0.5 | ESR | 1 | 0.50 | 0.091 |
| Lambertian/semi-specular | 1 TIPs film | 0.5 | ESR-BEF III | 0.83 | 0.42 | 0.047 |
| Semi-specular-2/Lambertian | Beaded ESR | 0.7 | 2 TIPs films | 0.5 | 0.35 | 0.029 |

-continued

| Top/Bottom reflector types | Top Reflector | $F_{top}$ | Bottom Reflector | $F_{Bottom}$ | CT | Measured light intensity |
|---|---|---|---|---|---|---|
| Lambertian/ Lambertian | 1 TIPs film | 0.5 | 2 TIPs films | 0.5 | 0.25 | 0.024 |

*To provide some initial forward and lateral scattering of light in this all specular case, a 1.7 cm × 6 cm piece of BEF-III was placed grooves up, sample and grooves perpendicular to the beam, where the laser first strikes the ESR.
** Bottom reflector is also on the side walls except for semi-specular bottom films, in which case it is ESR on the side walls.

If one or more of the components are graded spatially (e.g., a diffuser), then the overall cavity transport value will be graded in the same manner. The cavity transport CT can then be determined by averaging the measured CT values of the cavity over the area.

Applicants have found that for exemplary embodiments of useful backlight cavity geometries, such as a 46 inch diagonal LCD display having a cavity depth of 14 mm, CT vales of greater than 0.50 are necessary to provide a relatively uniform spatial variation of output brightness, when the front reflector $R^f_{hemi}$ is 70% or greater and the FWHM of the collimate light injection is 60 degrees or less.

Detailed examples are given below which represent a broad range of reflector types, ranging from substantially Lambertian to substantially specular. The semi-specular examples are for constructions (2) and (3) and were made by covering a specular reflector with a chosen diffuser. All samples were characterized with respect to the angular distribution of reflected light. This was done by using an Autronics Conoscope, available from autronic-MELCHERS GmbH, Germany, in the reflectance mode. The sample is placed about 2 mm from the conoscope lens, at the focal point. The sample is illuminated by the instrument with white collimated light with a chosen angle of incidence. The light reflected from the sample is collected by the conoscope lens and imaged onto a two dimensional detector array (CCD camera). This image is transformed into an angular distribution function using the calibration file. The instrument provides a very useful comparison of the angular reflection properties of various semi-specular and diffuse reflectors. A significant specular component of a reflector can result in saturation of the detector near the specular angle, but this value can be measured separately on a machine setting of lower sensitivity.

Example F

Bead Coated ESR

A film substantially identical to Vikuiti™ ESR film was coated with PMMA beads mixed with a polymeric binder, similar to the construction of beaded gain diffuser films which are commonly used as brightness enhancement films in LCD backlights. A sample of the film was inserted into the Autronics Conoscope and illuminated with collimated light incident at various angles of incidence θ in a plane of incidence whose azimuthal direction Phi (a rotation of the plane of incidence pivoted about the surface normal direction) was 0. The measured reflected light intensity vs. angle data for all theta and phi angles can be visualized with a contour plot such as the one in FIG. 12, which is for an angle of incidence of 45 degrees. The contour plot is a polar plot, with angle of reflection ranging from 0 degrees to 80 degrees along any azimuthal (Phi) direction. The horizontal direction is referred to as the Phi=0 axis, and the vertical direction is referred to as the Phi=90 axis. The detector is blocked for an angular range from about theta=42 degrees to 80 degrees near the Phi=0 degrees axis, resulting in an artifact as can be seen in the figure. The angular center of the specularly reflected component is apparent near −45 degrees along the Phi=0 degrees axis.

As explained above, the degree of specular vs. Lambertian characteristic can be effectively characterized by comparing the fluxes of the forward and back-scattered light components (F and B respectively), which can be obtained from the integrated intensities on the left and right halves of the plot (integrated intensity on the right and the left of the Phi=90 axis). The degree of specularity is then characterized by the Transport ratio T=(F−B)/(F+B).

Figure 12:
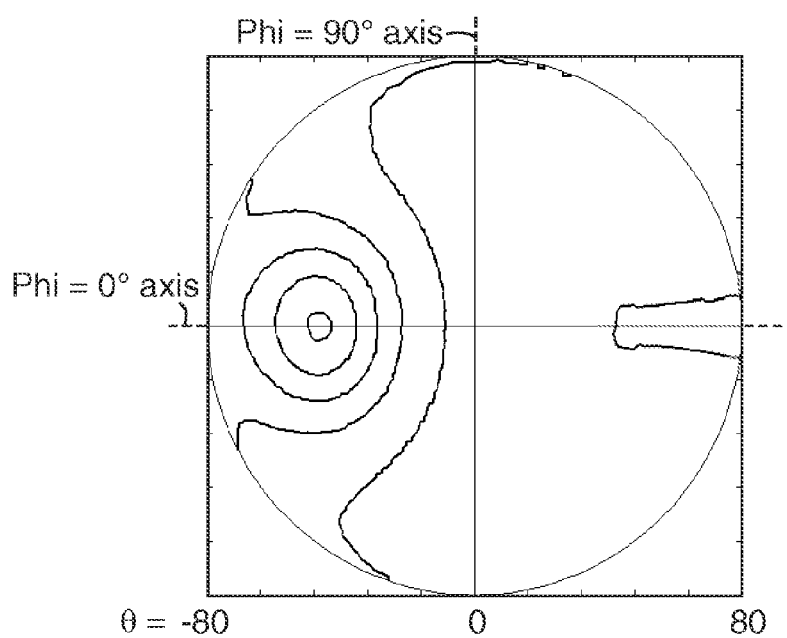
FIG. 12 is a conoscopic plot of reflected light for a sample film.
Figure 13A:
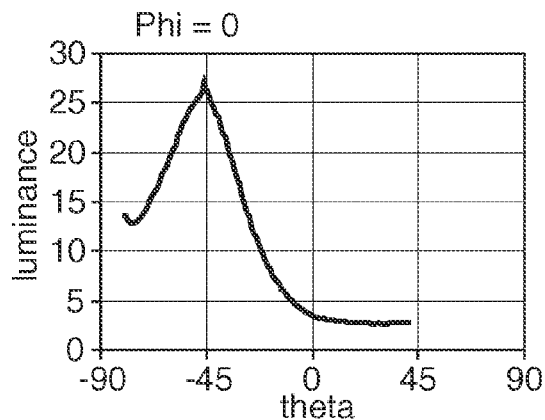
FIG. 13a is a graph of measured luminance vs. observation angle for the film of FIG. 12, the luminance measured in the plane of incidence (Phi=0)
Figure 13B:
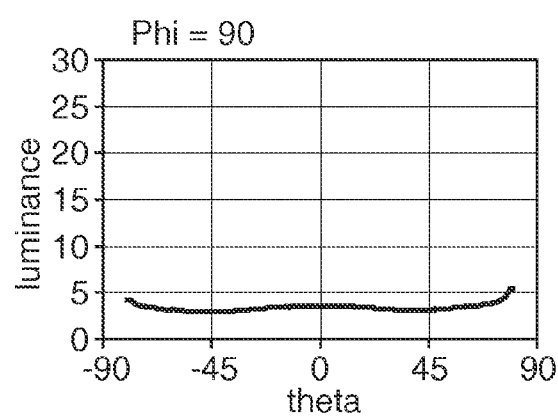
FIG. 13b is a graph of measured luminance vs. observation angle for the film of FIG. 12, the luminance measured in a plane perpendicular to the plane of incidence (Phi=90)

The contour plot of FIG. 12 is for illustrative purposes only and was not used in the calculation of T. Instead, quantitative values of reflectance, shown in FIGS. 13a and 13b for the Phi=0 and Phi=90 directions respectively, were used. Along the Phi=0 axis, one can see characteristics of a Gaussian scattering distribution as well as a baseline Lambertian component which is constant with angle. Data from θ=42 degrees to 90 degrees is not recorded due to blockage by the incident beam optical components of the Autronics instrument. For reflectors with slowly varying luminance data at these angles, the data can be estimated in this blocked area using values in adjacent areas. Along the Phi=90 axis the intensity is relatively flat, as for a Lambertian reflector. Integration over all solid angles yields a Transport ratio value of this sample (for a 45 degree incidence angle) of T=0.50.

As explained above, the transport ratio will generally be a function of angle of incidence. At normal incidence, for most samples, the forward and reverse components will generally be equal, yielding T=0. However, at higher angles of incidence the degree of forward scattering of a given reflector will become more apparent. The bead coated ESR was measured at various angles of incidence and the transport ratio T is plotted as curve F in FIG. 14 for these angles of incidence. The maximum transport ratio occurs near θ=45 degrees. Similarly, the transport ratio of MCPET (see Example C), described further below, was measured in the same manner. The measured transport ratios are not exactly zero at normal incidence for these samples, possibly because of small errors in the measured angle of incidence.

Figure 14:
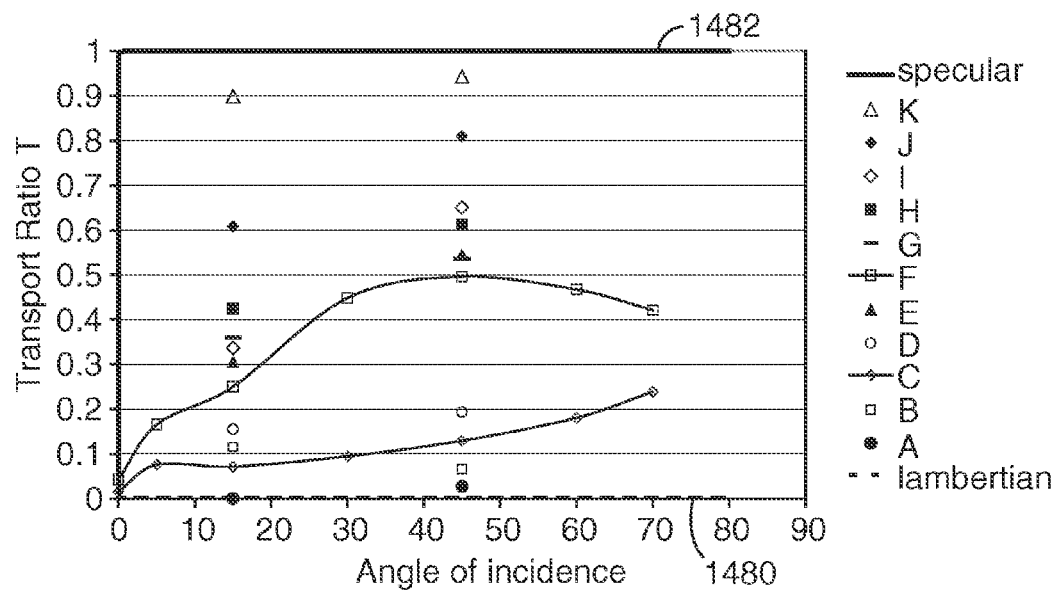
FIG. 14 is a plot of transport ratio T vs. angle of incidence for a variety of films sampled.

In the plot of FIG. 14, an ideal Lambertian reflector or transmitter (diffuser) is shown in a broken line, and has a value of T=0 for all incidence angles. In contrast, an ideal specular reflector or transmitter (shown in a thick solid line) has a value of T=1 for all incidence angles except for an incidence angle of exactly 0 degrees, at which T drops to 0.

A variety of other reflectors were also constructed as outlined in the additional examples below. Although the other types of reflectors have differing reflection properties, the trends are similar. Above 15 degrees, the transport ratio generally increases slowly with angle of incidence. The most rapid increase is at small angles above normal incidence. A pure specular reflector has T=0 at normal incidence and T=1 at all other angles. A pure Lambertian reflector has T=0 at all angles. The Examples A through K clearly show that a wide range of transport ratios can be made with different reflector constructions. The data is summarized in FIG. 14, and the sample description, labeling, and reflectivity and transport ratio (T) at 45 degrees is given in the following table:

| Label | Sample description | Reflectivity | T at 45° |
|---|---|---|---|
| A | TIPS (0.55 mm) | 0.985 | 0.011 |
| B | Mitsubishi W270 (125 microns) | 0.945 | 0.065 |
| C | MCPET | 0.98 | 0.129 |
| D | Astra DR85C + X-ESR | 0.965 | 0.194 |
| F | Beaded ESR | 0.98 | 0.496 |
| G | PEN/PMMA blend + X-ESR (X-axis) | 0.98 | 0.537 |
| E | TiO2/THV + X-ESR | 0.97 | 0.545 |

-continued

| Label | Sample description | Reflectivity | T at 45° |
|---|---|---|---|
| H | PEN/PMMA blend + X-ESR (Y-axis) | 0.97 | 0.612 |
| I | DFA + X-ESR | 0.95 | 0.651 |
| J | Lenslets on X-ESR | 0.99 | 0.810 |
| K | Keiwa PBS070 + X-ESR | 0.975 | 0.943 |

From a review of these examples and FIG. 14, we characterize a reflector or other component as semi-specular if: (1) the transport ratio T is greater than 0.15 (15%), preferably greater than 0.20 (20%), at a 15 degree incidence angle, to distinguish over substantially Lambertian components, and (2) the transport ratio T is less than 0.95 (95%), preferably less than 0.90 (90%), at a 45 degree incidence angle, to distinguish over substantially specular components.

Alternatively, one may wish to characterize "semi-specular" as having a transport ratio T greater than 0.2 (20%) at 45 degrees, to distinguish over Lambertian components. To distinguish over specular components, one may then add the requirement that at least 10% of the light is scattered in directions which lie outside of a cone of 10 degrees included-angle centered on the 45 degree specular direction.

Measurement conditions may have to be modified when characterizing reflectors that are locally specular, but are globally semi-specular, such as, e.g., a corrugated or thermoformed thin film mirror. If the spot size of the measurement system such as the Autronics instrument is smaller than the average shape dimensions on the reflector, then several measurements should be taken at different locations on the shaped reflector in order to provide a good estimate of its reflecting angle distribution.

Example E

TiO2 Particles in THV on X-ESR

Figure 15A:
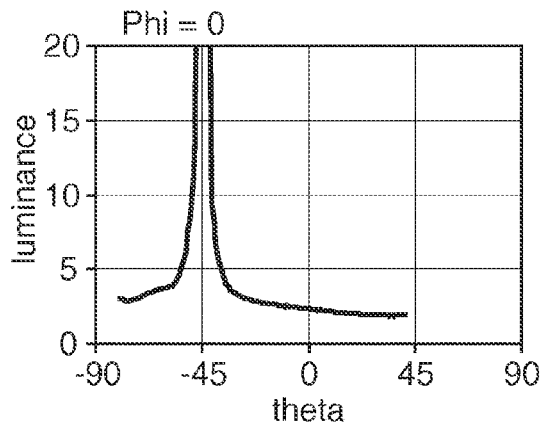
Figure 15B:
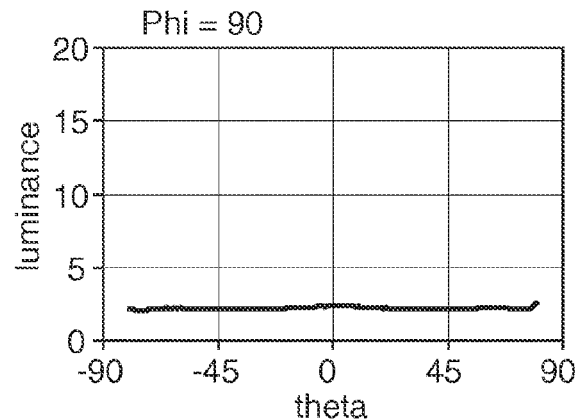

An example of construction (2), a partial Lambertian plus high reflectance specular reflector, was made by laminating a diffusing film to a broadband multilayer mirror. The mirror was constructed with a multilayer of PEN and PMMA as for conventional Vikuiti™ ESR, but with an extended reflection band (hence the designation X-ESR) that extends from 400 nm all the way to 1600 nm. The diffuse film was made by blending 0.1% by weight of a white $TiO_2$ pigment into THV, which was then extruded and cast as a smooth film. Standard polymer extrusion and film casting processes were employed. The small particle size of the titania, coupled with the large index difference between the titania and the THV (2.4 vs. 1.35) results in a wide angle scattering diffuser. Only the low concentration of the titania prevents the diffuse film from reflecting most of the light. Substantial amounts of light pass through the THV film and are specularly reflected by the multilayer mirror. The reflection result, shown in FIGS. 15a and 15b for a specular beam having an angle of incidence of 45 degrees, shows a combination of a near specular reflection at −45 degrees and a broad Lambertian background.

For the Phi=0 trace, the peak value of the specular beam is not shown here. On a less sensitive recording scale, the measured peak luminance at θ=−45 degrees was 1,907. The relative strength of the specular and Lambertian components can be adjusted by changing the concentration of the TiO2 or the thickness of the THV film, or both.

Results similar to those of Example K (below) would be expected for construction 1, which involves combinations of a partially reflecting specular mirror over a high reflectance Lambertian reflector. In that case, the relative amounts of specular vs. Lambertian scattered light can be adjusted by using partial reflectors with differing transmission values. The Lambertian reflector should remain very high reflectance to avoid transmission losses through the back reflector.

Example K

Keiwa PBS-070 on X-ESR

Figure 16:
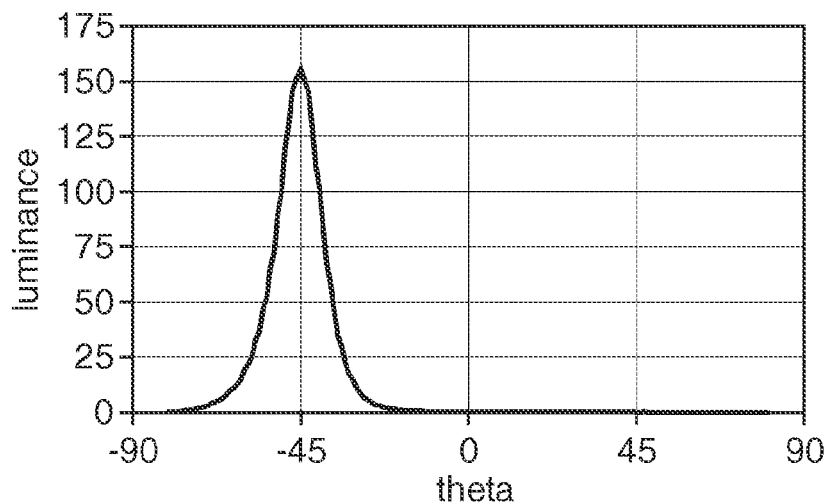

A substantially forward scattering reflector can be obtained by combining a forward scattering diffuser with a specular reflector. This is an example of construction (3). A commercially available diffuser, Keiwa Opulus PBS-070, was laminated to an extended band multilayer specular mirror (X-ESR) described above. The measured reflection distribution, shown in FIG. 16 for the case of 45 degrees angle of incidence, is close to a Gaussian distribution about the specular direction. In this case most of the light incident at 45 degrees is reflected in a relatively narrow cone about the specular direction of −45 degrees. The peak luminance along the Phi=90 axis was only 0.8. This sample has a very high transport ratio at 45 degrees, with T=0.943.

Example I

DFA on X-ESR

Figure 17A:
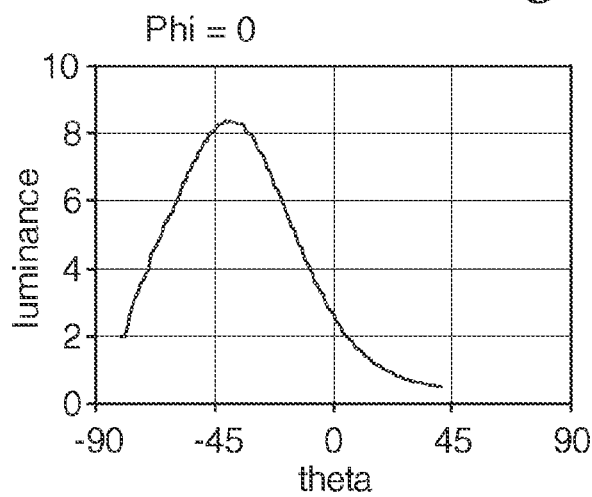
Figure 17B:
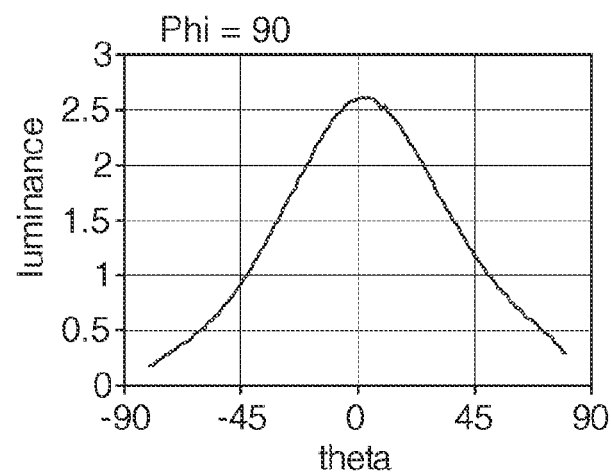

A broader distribution of scattered light than Example K can be obtained with other substantially forward scattering diffusers. Diffusers made with spherical particles in a matrix that has an index of refraction only slightly different than the index of the particles can have this property. One example is a diffuser film known as DFA from 3M Co. The particle loading and diffuser thickness then determine the degree of specularity, which affects the transport ratio. A 0.4 mm thick sheet of DFA was laminated to the X-ESR and measured in the Autronics instrument with 45 degree incident light. Luminance data extracted for reflectance angles along the phi=0 and phi=90 degree axis are shown in FIGS. 17a and 17b. Although there is no pure Lambertian component, the measured transport ratio at 45 degrees drops to T=0.651.

Examples G and H

Reflector with Asymmetric Transport Ratio

A mixture of PEN and PMMA, with 27% by weight of PMMA, was blended in a twin screw extruder and cast with standard film making equipment. The cast web was sequentially oriented in a length orienter and in a tenter with conditions used for making PEN films. The stretch ratios were 3.7×3.7. The resultant film was 50 microns thick and had a measured hemispheric reflectance at normal incidence of about 75%. This film was laminated to the X-ESR and measured in the Autronics conoscope in two different orientations. Even though the blend diffuser film was oriented equally in the X and Y directions, it exhibits an asymmetric scattering distribution. This may be due to elongation of the PMMA disperse phase particles during extrusion through the die. The conoscopic plots, shown in FIGS. 18a and 18b, illustrate this asymmetry for light incident along the X and Y axis respectively. The measured transport ratios at 45 degrees were 0.537 and 0.612 respectively. This asymmetry can offer more options for LED placement in LCD backlight designs.

Example A

TIPS Near-Lambertian Reflector

Various near-Lambertian diffuse reflectors are described in U.S. Pat. No. 5,976,686 (Kaytor et. al.). A particularly efficient reflector can be made with the process described as thermally induced phase separation (TIPS). A reflector of thickness about 0.55 mm, made by laminating two TIPS films of thickness about 0.27 mm was measured in the Autronics conoscope as for the previous examples. The traces along the phi=0 and phi=90 directions are plotted in FIGS. 19a and 19b and show a near-Lambertian character. Only a small specular peak is evident at −45 degrees. The transport ratio for this reflector was the lowest of all samples with T=0.011 at 45 degrees.

Example C

MCPET

A sheet of diffuse reflector called MCPET, made by Furukawa in Japan, was measured in the Autronics instrument. The reflector was 0.93 mm thick with a hemispherical reflectance of about 98% for normally incident light. The MCPET has a slightly higher specular component than the TIPS film, but is still substantially Lambertian as is evident from the phi=0 and phi=90 traces of the conoscopic data shown in FIGS. 20a and 20b. A plot of the transport ratio vs. angle of incidence is shown above in FIG. 14.

The hemispherical reflectance of several other semi-specular reflectors was measured in the same manner as the Examples above. A short description of each reflector is given below, and the transport ratio of all measured reflectors is listed in Table II for the case of 45 degrees angle of incidence. The hemi-spherical reflectance of all samples for near-normal incident light was measured in a Perkin Elmer Lambda 950 using a NIST calibrated reference reflector. All reflectors show a reflectance of about 95% or greater.

Example D

Bulk Diffuser on X-ESR

Astra 85C is a semi-specular bulk diffuser with 85% transmission from Astra Products. A piece of this diffuser, Clarex-DR IIIC light diffusion film, grade number 85C, was laminated to the X-ESR film.

Example B

White Reflector

W270, a 125 micron thick white reflector from Mitsubishi, Japan.

Example J

Microlens Array on X-ESR

A semi-specular reflector was constructed by casting an array of microlenses on the surface of a film of X-ESR. The microlenses have an outside diameter of 30 microns and a height of about 6.3 microns. The lens curvature is spherical, with a radius of 18.7 microns. The microlenses were cast in a hexagonal array with about 90% surface area coverage of the mirror. The lens material was a UV curable resin with index of about n=1.5. Lenslet of other geometrical shapes and sizes are also possible.

Backlight Examples

Numerous hollow recycling cavity backlights of different sizes and shapes were constructed using a variety of low loss reflective films and semi-specular components. In some, for example, beaded-ESR film (Example F above) was used as a back reflector, with different asymmetric reflective films (ARFs) used as front reflectors. In others, a gain diffusing film was included at the front of the recycling cavity with an asymmetric reflective film. Many of the backlights also included light source members (e.g., rows of multicolored LEDs disposed in a wedge-shaped reflectors) that confined the light injected into the cavity into a full angle-width at half maximum power that is substantially smaller than a Lambertian distribution. Many of the backlights exhibited satisfactory overall brightness and uniformity, such as would be suitable for LCD display applications or other applications. These backlight examples are described in the following group of commonly assigned PCT Patent Applications, and are incorporated herein by reference: PCT Patent Publication No. WO2008/144656, PCT Patent Publication No. WO2008/144636, PCT Patent Publication No. WO2008/147753 and PCT Patent Publication No. WO 2008/144650.

Unless otherwise indicated, references to "backlights" are also intended to apply to other extended area lighting devices that provide nominally uniform illumination in their intended application. Such other devices may provide either polarized or unpolarized outputs. Examples include light boxes, signs, channel letters, and general illumination devices designed for indoor (e.g., home or office) or outdoor use, sometimes referred to as "luminaires." Note also that edge-lit devices can be configured to emit light out of both opposed major surfaces—i.e., both out of the "front reflector" and "back reflector" referred to above—in which case both the front and back reflectors are partially transmissive. Such a device can illuminate two independent LCD panels or other graphic members placed on opposite sides of the backlight. In that case, the front and back reflectors may be of the same or similar construction.

The term "LED" refers to a diode that emits light, whether visible, ultraviolet, or infrared. It includes incoherent encased or encapsulated semiconductor devices marketed as "LEDs," whether of the conventional or super radiant variety. If the LED emits non-visible light such as ultraviolet light, and in some cases where it emits visible light, it is packaged to include a phosphor (or it may illuminate a remotely disposed phosphor) to convert short wavelength light to longer wavelength visible light, in some cases yielding a device that emits white light. An "LED die" is an LED in its most basic form, i.e., in the form of an individual component or chip made by semiconductor processing procedures. The component or chip can include electrical contacts suitable for application of power to energize the device. The individual layers and other functional elements of the component or chip are typically formed on the wafer scale, and the finished wafer can then be diced into individual piece parts to yield a multiplicity of LED dies. An LED may also include a cup-shaped reflector or other reflective substrate, encapsulating material formed into a simple dome-shaped lens or any other known shape or structure, extractor(s), and other packaging elements, which elements may be used to produce a forward-emitting, side-emitting, or other desired light output distribution.

Unless otherwise indicated, references to LEDs are also intended to apply to other sources capable of emitting bright light, whether colored or white, and whether polarized or unpolarized, in a small emitting area. Examples include semiconductor laser devices, and sources that utilize solid state laser pumping.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Various modifications and alterations of this disclosure will be apparent to those skilled in the art without departing from the scope and spirit of this disclosure, and it should be understood that this disclosure is not limited to the illustrative embodiments set forth herein. All U.S. patents, patent application publications, unpublished patent applications, and other patent and non-patent documents referred to herein are incorporated by reference in their entireties, except to the extent any subject matter therein directly contradicts the foregoing disclosure.

The invention claimed is:

1. A backlight, comprising:
   a front and back reflector forming a hollow light recycling cavity, the front reflector being partially transmissive to provide an output illumination area, and wherein the front reflector has a reflectivity for p-polarized light that is: (1) constant, or (2) increases, with angle of incidence, and a transmission that generally decreases with angle of incidence;
   a component that provides the cavity with a desired balance of specular and diffuse characteristics, the component being characterized by a transport ratio greater than 15% at a 15 degree incidence angle and less than 95% at a 45 degree incidence angle, wherein the front or back reflectors can be or include the component, or the component can be distinct from the front and back reflectors, wherein the transport ratio for the component, for light of a given incidence angle, equals (F−B)/(F+B), where F is the amount of light scattered into forward directions upon interaction of the incident light with the component, and B is the amount of light scattered into backward directions upon interaction of the incident light with the component; and
   one or more light source members disposed to emit light into the light recycling cavity over a limited angular distribution.

2. The backlight of claim 1, wherein the front reflector has a hemispherical reflectivity for unpolarized visible light of $R^f_{hemi}$, the back reflector has a hemispherical reflectivity for unpolarized visible light of $R^b_{hemi}$, and $R^b_{hemi}$ is greater than $R^f_{hemi}$.

3. The backlight of claim 2, wherein $R^b_{hemi}$ is greater than about 0.95.

4. The backlight of claim 1, wherein the output illumination area defines a transverse plane, and the light source members emit light into the light recycling cavity with a full angle-width at half maximum power (FWHM) relative to the transverse plane in a range from 0 to 60 degrees.

5. The backlight of claim 4, wherein the light source members emit light into the light recycling cavity with an FWHM relative to the transverse plane in a range from 0 to 30 degrees.

6. The backlight of claim 1, wherein the light source members include one or more LEDs.

7. The backlight of claim 1, wherein the reflectivity and transmission of the front reflector are for unpolarized visible light in any plane of incidence.

8. The backlight of claim 1, wherein the reflectivity and transmission of the front reflector are for light of a useable polarization state incident in a plane for which oblique light of the useable polarization state is p-polarized.

9. A luminaire comprising the backlight of claim 1.

10. A display comprising the backlight of claim 1.

11. A backlight, comprising:
    a front and back reflector forming a light recycling cavity, the front reflector being partially transmissive to provide an output illumination area, and wherein the front reflector has a reflectivity for p-polarized light that is: (1) constant, or (2) increases, with angle of incidence, and a transmission that generally decreases with angle of incidence;
    a component that provides the cavity with a desired balance of specular and diffuse characteristics, the component being characterized by a transport ratio greater than 15% at a 15 degree incidence angle and less than 95% at a 45 degree incidence angle, wherein the front or back reflectors can be or include the component, or the component can be distinct from the front and back reflectors, wherein the transport ratio for the component, for light of a given incidence angle, equals (F−B)/(F+B), where F is the amount of light scattered into forward directions upon interaction of the incident light with the component, and B is the amount of light scattered into backward directions upon interaction of the incident light with the component; and
    one or more light source members disposed to emit light into the light recycling cavity over a limited angular distribution;
    wherein the cavity comprises a cavity transport value of greater than about 0.5 and less than about 0.95.

12. The backlight of claim 11, wherein the front reflector has a hemispherical reflectivity for unpolarized visible light of $R^f_{hemi}$, the back reflector has a hemispherical reflectivity for unpolarized visible light of $R^b_{hemi}$, $R^b_{hemi}$ is greater than $R^f_{hemi}$, and $R^b_{hemi}$ is greater than about 0.95.

13. The backlight of claim 11, wherein the output illumination area defines a transverse plane, and the light source members emit light into the light recycling cavity with a full angle-width at half maximum power (FWHM) relative to the transverse plane in a range from 0 to 60 degrees.

14. The backlight of claim 13, wherein the light source members emit light into the light recycling cavity with an FWHM relative to the transverse plane in a range from 0 to 30 degrees.

15. The backlight of claim 11, wherein the reflectivity and transmission of the front reflector are for unpolarized visible light in any plane of incidence.

16. The backlight of claim 11, wherein the reflectivity and transmission of the front reflector are for light of a useable polarization state incident in a plane for which oblique light of the useable polarization state is p-polarized.

17. The backlight of claim 11, wherein the light recycling cavity is hollow.

18. A luminaire comprising the backlight of claim 11.

19. A display comprising the backlight of claim 11.

* * * * *

UNITED STATES PATENT AND TRADEMARK OFFICE
CERTIFICATE OF CORRECTION

PATENT NO. : 9,091,408 B2
APPLICATION NO. : 14/082788
DATED : July 28, 2015
INVENTOR(S) : Michael F. Weber et al.

Page 1 of 2

It is certified that error appears in the above-identified patent and that said Letters Patent is hereby corrected as shown below:

On the title page, item 56

Page 2, Column 2, (US Patent Documents),
Line 29, delete "Hebrink" and insert -- Hebrink et al. --, therefor.

Page 3, Column 2, (Other Publications),
Line 33, delete ""Intergrated" and insert -- "Integrated --, therefor.

In the specification

Column 9,
Lines 35-42, delete "Characterizing . . . films")." and insert the same on Column 9, Line 34, as the continuation of the same paragraph.

Column 10,
Line 2, delete "US08/64133," and insert -- US08/64133), --, therefor.
Line 62, delete "63274WO004" and insert -- PCT/US08/64133 --, therefor.

Column 12,
Line 37, delete "PCT/US08/64123" and insert -- PCT/US08/64125 --, therefor.

Column 14,
Lines 6-23, delete "Referring . . . guide." and insert the same on Column 14, Line 7, as a new paragraph.

Column 19,
Line 55, delete "+1-10" and insert -- +/-10 --, therefor.

Signed and Sealed this
Fourteenth Day of June, 2016

Michelle K. Lee
*Director of the United States Patent and Trademark Office*

CERTIFICATE OF CORRECTION (continued)
U.S. Pat. No. 9,091,408 B2

Column 20,
Line 15, delete "T 0.02)" and insert -- T$\approx$0.02) --, therefor.

In the claims

Column 28,
Line 41, in claim 12, delete "$R_{bhemi}$" and insert -- $R^b_{hemi}$ --, therefor.